US009534619B2

(12) United States Patent
Sesser et al.

(10) Patent No.: US 9,534,619 B2
(45) Date of Patent: Jan. 3, 2017

(54) SPRINKLER WITH MULTI-FUNCTIONAL, SIDE-LOAD NOZZLE WITH NOZZLE STORAGE CLIP AND RELATED TOOL

(71) Applicant: Nelson Irrigation Corporation, Walla Walla, WA (US)

(72) Inventors: George L. Sesser, Walla Walla, WA (US); Richard L. Schisler, Walla Walla, WA (US); Barton R. Nelson, Walla Walla, WA (US); Craig B. Nelson, Walla Walla, WA (US); Reid A. Nelson, Walla Walla, WA (US); Meade M. Neal, Walla Walla, WA (US)

(73) Assignee: NELSON IRRIGATION CORPORATION, Walla Walla, WA (US)

( * ) Notice: Subject to any disclaimer, the term of this patent is extended or adjusted under 35 U.S.C. 154(b) by 345 days.

(21) Appl. No.: 14/049,633

(22) Filed: Oct. 9, 2013

(65) Prior Publication Data

US 2015/0001315 A1 Jan. 1, 2015

Related U.S. Application Data

(63) Continuation-in-part of application No. 13/927,992, filed on Jun. 26, 2013.

(51) Int. Cl.
*B05B 15/06* (2006.01)
*F16B 2/22* (2006.01)
(Continued)

(52) U.S. Cl.
CPC .............. *F16B 2/22* (2013.01); *B05B 1/326* (2013.01); *B05B 3/0486* (2013.01);
(Continued)

(58) Field of Classification Search
CPC ........... B05B 3/02; B05B 1/3026; B05B 1/326
(Continued)

(56) References Cited

U.S. PATENT DOCUMENTS 2,060,943 A 11/1936 Lieb
2,281,229 A 4/1942 Bullock
(Continued)

FOREIGN PATENT DOCUMENTS

DE 58904 9/1891
DE 3719438 A1 12/1988
(Continued)

OTHER PUBLICATIONS

Partial International Search Report dated Nov. 24, 2014 issued in PCT International Patent Application No. PCT/US2014/054674, 3 pp.

(Continued)

*Primary Examiner* — Arthur O Hall
*Assistant Examiner* — Tuongminh Pham
(74) *Attorney, Agent, or Firm* — Nixon & Vanderhye P.C.

(57) ABSTRACT

A clip for holding a pair of nozzle inserts for use with an irrigation sprinkler includes at least two flexible attachment arms, each attachment arm provided with an elongated slot and a retention shoulder on an inside surface thereof, adjacent the elongated slot. Each attachment arm is adapted to be received in an opening in a respective nozzle insert and retained therein by the retention shoulder. A related tool includes a pair of gripper arms and a respective pair of jaws extending from the gripper arms, pivotally secured to one another. One jaw is formed with a pair of parallel prongs, and the other jaw is formed with a flat head projecting toward the pair of prongs. The jaws are adapted to engage the nozzle insert and disengage the retention shoulder to permit removal of the nozzle insert from the clip.

8 Claims, 40 Drawing Sheets

(51) Int. Cl.
*B25B 7/02* (2006.01)
*B05B 1/32* (2006.01)
*B05B 3/04* (2006.01)
*B05B 15/02* (2006.01)

(52) U.S. Cl.
CPC ............ *B05B 15/0283* (2013.01); *B25B 7/02* (2013.01); *Y10T 29/539* (2015.01); *Y10T 403/45* (2015.01)

(58) Field of Classification Search
USPC .............. 239/119, 71, 73–74, 443–446, 106, 239/581.1; 222/543–546; 285/222.12, 285/316.7
See application file for complete search history.

(56) References Cited

U.S. PATENT DOCUMENTS

| | | | |
|---|---|---|---|
| 2,918,200 A | 12/1959 | Libit et al. | |
| 3,563,463 A | 2/1971 | Walker | |
| 3,769,933 A | 11/1973 | Fox | |
| 3,982,442 A | 9/1976 | Shiurila | |
| 4,157,163 A | 6/1979 | Pinto et al. | |
| 4,635,850 A | 1/1987 | Leisi | |
| 4,801,089 A | 1/1989 | Zeman | |
| 4,819,872 A | 4/1989 | Rosenberg | |
| 4,830,281 A | 5/1989 | Calder | |
| 5,022,292 A * | 6/1991 | Hammer | B25B 7/02 29/243.56 |
| 5,039,016 A | 8/1991 | Gunzel, Jr. et al. | |
| 5,211,335 A | 5/1993 | Strid | |
| 5,234,169 A | 8/1993 | McKenzie | |
| 5,253,807 A | 10/1993 | Newbegin | |
| 5,335,859 A | 8/1994 | Thayer et al. | |
| 5,411,350 A | 5/1995 | Breault | |
| 5,456,411 A | 10/1995 | Scott et al. | |
| 5,487,507 A | 1/1996 | McDonald et al. | |
| 5,560,548 A | 10/1996 | Mueller et al. | |
| 5,699,962 A | 12/1997 | Scott et al. | |
| 5,727,739 A | 3/1998 | Hamilton | |
| 5,749,528 A | 5/1998 | Carey et al. | |
| 5,762,269 A | 6/1998 | Sweet | |
| 5,775,744 A | 7/1998 | Smith, III | |
| 5,820,025 A | 10/1998 | Troudt | |
| 5,884,847 A | 3/1999 | Christopher | |
| 5,899,384 A | 5/1999 | Solbakke | |
| 6,098,490 A | 8/2000 | Kowalewski et al. | |
| 6,234,411 B1 | 5/2001 | Walker et al. | |
| 6,244,527 B1 | 6/2001 | Ferrazza et al. | |
| 6,322,284 B1 | 11/2001 | Bonardo | |
| 6,398,128 B1 | 6/2002 | Hamilton et al. | |
| 6,405,902 B2 | 6/2002 | Everett | |
| 6,409,221 B1 | 6/2002 | Robinson | |
| 6,447,027 B1 | 9/2002 | Lilley et al. | |
| 6,616,065 B2 | 9/2003 | Martin | |
| 6,669,120 B2 | 12/2003 | Vernia | |
| 6,676,038 B2 | 1/2004 | Gressett, Jr. et al. | |
| 6,702,198 B2 | 3/2004 | Tam et al. | |
| 6,749,134 B2 | 6/2004 | Arenson et al. | |
| 6,772,964 B2 | 8/2004 | Funseth et al. | |
| 6,871,795 B2 | 3/2005 | Anuskiewicz | |
| 6,880,768 B2 | 4/2005 | Lau | |
| 7,328,853 B2 | 2/2008 | Carey et al. | |
| 7,431,346 B2 | 10/2008 | Frost et al. | |
| 7,472,840 B2 | 1/2009 | Gregory | |
| 7,644,877 B2 | 1/2010 | Drechsel | |
| 7,980,490 B2 | 7/2011 | Waddelow et al. | |
| 2004/0217196 A1 | 11/2004 | Yurek, Jr. et al. | |
| 2007/0131792 A1 | 6/2007 | Gardner et al. | |
| 2007/0158528 A1 | 7/2007 | Vella et al. | |
| 2009/0200796 A1 | 8/2009 | Lai | |
| 2009/0321543 A1 | 12/2009 | Lawyer et al. | |
| 2010/0025983 A1 | 2/2010 | Rosch et al. | |
| 2010/0102149 A1* | 4/2010 | Lawyer | B05B 15/065 239/722 |
| 2010/0108783 A1 | 5/2010 | Joseph et al. | |
| 2012/0269570 A1 | 10/2012 | Felber | |
| 2012/0312904 A1 | 12/2012 | Lawyer et al. | |

FOREIGN PATENT DOCUMENTS

| | | |
|---|---|---|
| DE | 4401488 A1 | 7/1995 |
| EP | 0 255 463 | 2/1988 |
| FR | 2 266 070 | 10/1975 |
| GB | 2 125 878 | 3/1984 |
| GB | 2 164 383 | 3/1986 |
| JP | S 47-1697 | 8/1972 |
| JP | 05277406 | 10/1993 |
| RU | 923635 | 4/1982 |
| WO | WO 90/15184 | 12/1990 |
| WO | WO 2007/126201 | 11/2007 |
| WO | WO 2011/113733 | 9/2011 |

OTHER PUBLICATIONS

International Search Report dated Sep. 23, 2014 issued in PCT International Patent Application No. PCT/US2014/044014, 3 pp.
U.S. Appl. No. 13/927,992, filed Jun. 26, 2013.
U.S. Appl. No. 13/927,957, filed Jun. 26, 2013.
U.S. Appl. No. 14/050,610, filed Oct. 10, 2013.
U.S. Office Action dated Jan. 13, 2016 issued in U.S. Appl. No. 13/927,992, 37 pp.

* cited by examiner

US 9,534,619 B2

SPRINKLER WITH MULTI-FUNCTIONAL, SIDE-LOAD NOZZLE WITH NOZZLE STORAGE CLIP AND RELATED TOOL

This application is a continuation-in-part of U.S. application Ser. No. 13/927,992, filed Jun. 26, 2013, the entire content of which is hereby incorporated by reference in this application.

This invention relates to sprinklers especially suited for, but not limited to agricultural sprinklers used on center-pivot irrigation machines, and specifically, to a multi-nozzle insert holder or clip and associated tool.

BACKGROUND

Center-pivot irrigation machines include large truss spans supported on wheeled towers that rotate about a center support. The truss spans mount many sprinklers along the length of the spans, either directly or suspended from the trusses on rigid or flexible drop hoses.

Because sprinklers of this type (and particularly the sprinkler nozzles) are oftentimes exposed to unfiltered or poorly filtered water containing sand, dirt, debris, etc., it is necessary to periodically clean or flush the individual sprinklers including the sprinkler nozzle bores. At the same time, it is necessary to install nozzles of different orifice size along the truss span length to obtain the desired flow rate in light of the different circle diameters traced by the individual sprinklers as the machine rotates about its center support. Flushing and/or changing nozzle size generally requires at least some disassembly of the sprinkler (and possibly shutting down the machine), which, multiplied over tens or even hundreds of sprinklers, is labor intensive, time consuming and therefore costly.

The present invention seeks to simplify the nozzle changeover and/or flush operations by providing a multi-functional, side-loading nozzle insert that is (1) easily installed and removed, thereby facilitating nozzle changeover; and (2) when installed, easily rotated between, for example, "INSERTION", "ON", "OFF", "NOZZLE FLUSH" and "LINE FLUSH" operating positions. It is also a feature to provide a clip for holding at least one and up to two additional nozzle inserts on the sprinkler body so that the user can readily change the nozzle size/flow rate as desired, along with a manually-operated hand tool designed to facilitate removal of the nozzle inserts from the clip.

BRIEF SUMMARY OF THE INVENTION

In one exemplary but nonlimiting embodiment, the invention relates to a clip for holding a pair of nozzle inserts for use with an irrigation sprinkler, the clip comprising at least two flexible attachment arms, each attachment arm provided with an elongated slot and a retention shoulder on an inside surface thereof, adjacent the elongated slot.

In another version, the invention relates to a nozzle insert for loading into a complementary recess in a sprinkler body comprising an insert body having an axis of rotation, a nozzle bore extending through the insert body; and a directional turning knob at a forward end of the insert body enabling rotation of the nozzle insert relative to the sprinkler body when the insert body is installed within the sprinkler body, the directional turning knob incorporating an elongated slot having openings along a front wall of the turning knob and at one end wall of the turning knob, the slot adapted to receive through one of the openings an attachment arm of a clip capable of holding at least two of the nozzle inserts.

In still another version, the invention relates to a clip and nozzle insert assembly for use with an irrigation sprinkler, the clip comprising at least two flexible attachment arms; each attachment arm provided with an elongated slot and a retention shoulder adjacent the elongated slot, each attachment arm received in an opening in a respective nozzle insert and retained therein by the retention shoulder.

In still another aspect, there is provided a tool for facilitating removal of a nozzle insert from a nozzle insert retention clip comprising a pair of gripper arms and a respective pair of jaws extending from the gripper arms, pivotally secured to one another about a pivot, and first and second jaws at opposite ends of the pair of gripper arms, respectively; one jaw comprising a pair of parallel prongs, and the other of the jaws comprising a flat head projecting toward the pair of prongs.

The invention will now be described in greater detail in connection with the drawings identified below.

DETAILED DESCRIPTION OF THE DRAWINGS

Figure 1:
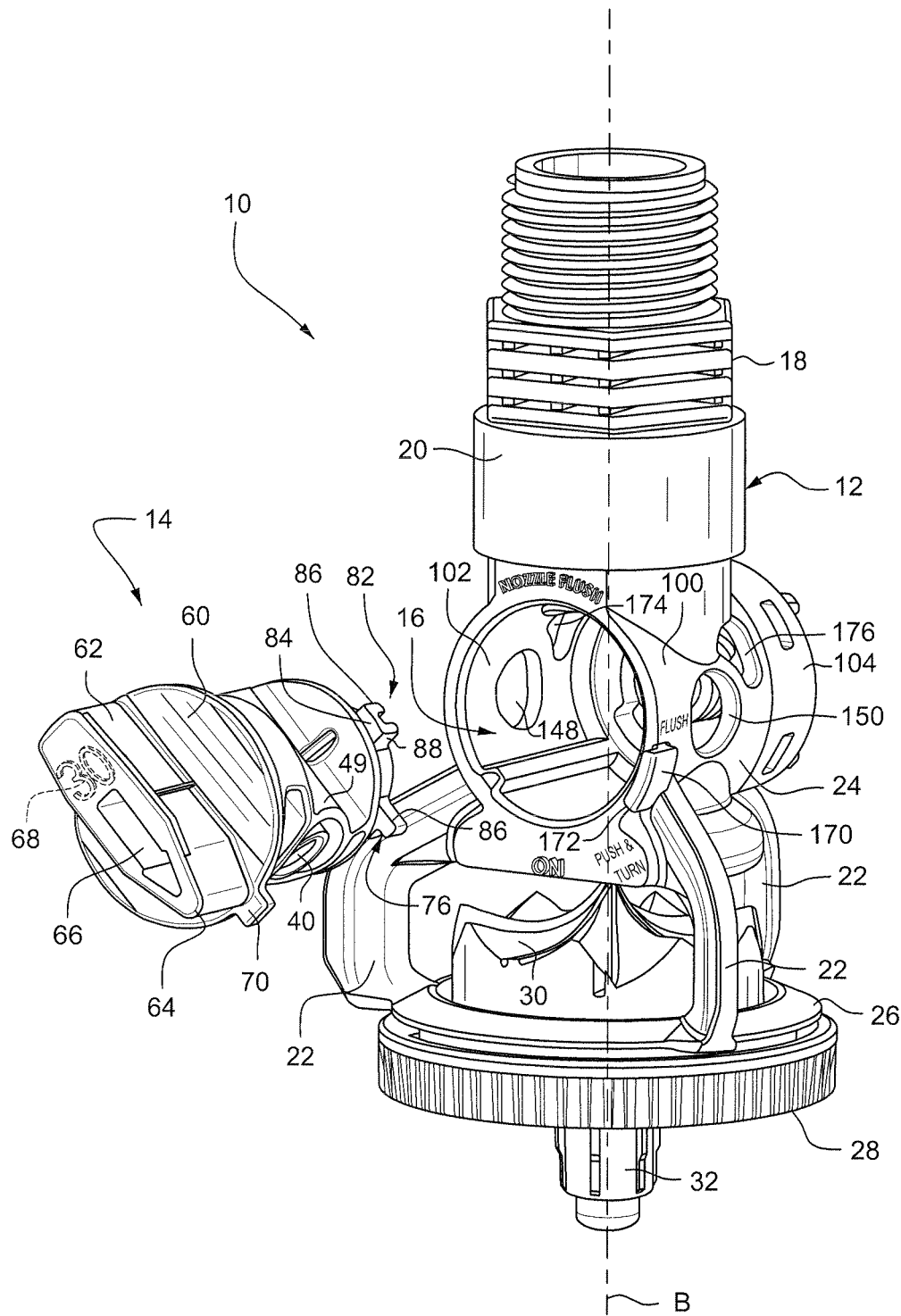
FIG. 1 is a perspective view of a sprinkler body and nozzle insert in accordance with a first exemplary but nonlimiting embodiment, showing the nozzle insert removed from the sprinkler body and oriented in an INSERTION position.

FIG. 1 illustrates a sprinkler assembly 10 that includes a sprinkler body 12 and a nozzle insert 14 receivable within a sideways-oriented, complementary recess 16 provided in the sprinkler body 12. The sprinkler body mounts a conventional adapter 18 via a threaded coupling at the upstream end 20 of the sprinkler body 12. A plurality of support struts 22 are provided at the downstream end 24 of the sprinkler body, the support struts connected to a mounting ring 26 adapted for securing a conventional water deflector or distribution plate 28 formed with grooves 30 that typically cause the plate to rotate when impinged upon by a stream emitted from the sprinkler nozzle. The plate 28 may incorporate an otherwise conventional viscous brake or rotational speed-retarding device 32.

Before describing the nozzle insert 14 and sprinkler body 12 in detail, it is important to note that any references to relative terms such as "upper", "lower", "left-side", "right-side", "front" and "rear", relate to the sprinkler body and nozzle insert as oriented in the various figures and are not intended to be in any way limiting, because the sprinkler may assume other orientations in use. Since, however, the sprinkler will generally assume the orientation shown in FIG. 1 or a reverse (inverted) orientation, it is appropriate to refer to the nozzle insert 14 as a "side-loading" nozzle insert.

With continued reference to FIG. 1, but also especially to FIGS. 2-5, the nozzle insert 14 is formed as a substantially-cylindrical body (or, simply, "insert body") 34, preferably injection-molded of hard plastic material such as PVC (or other suitable plastic or metal material). The insert body 34 has a longitudinal center axis A (FIG. 2), also referred to herein as the "insert axis" or insert "axis of rotation" that, when installed in the sprinkler body, is perpendicular to a longitudinal center axis B (FIGS. 1 and 7) of the sprinkler body, also referred to herein as the "sprinkler axis".

Figure 3:
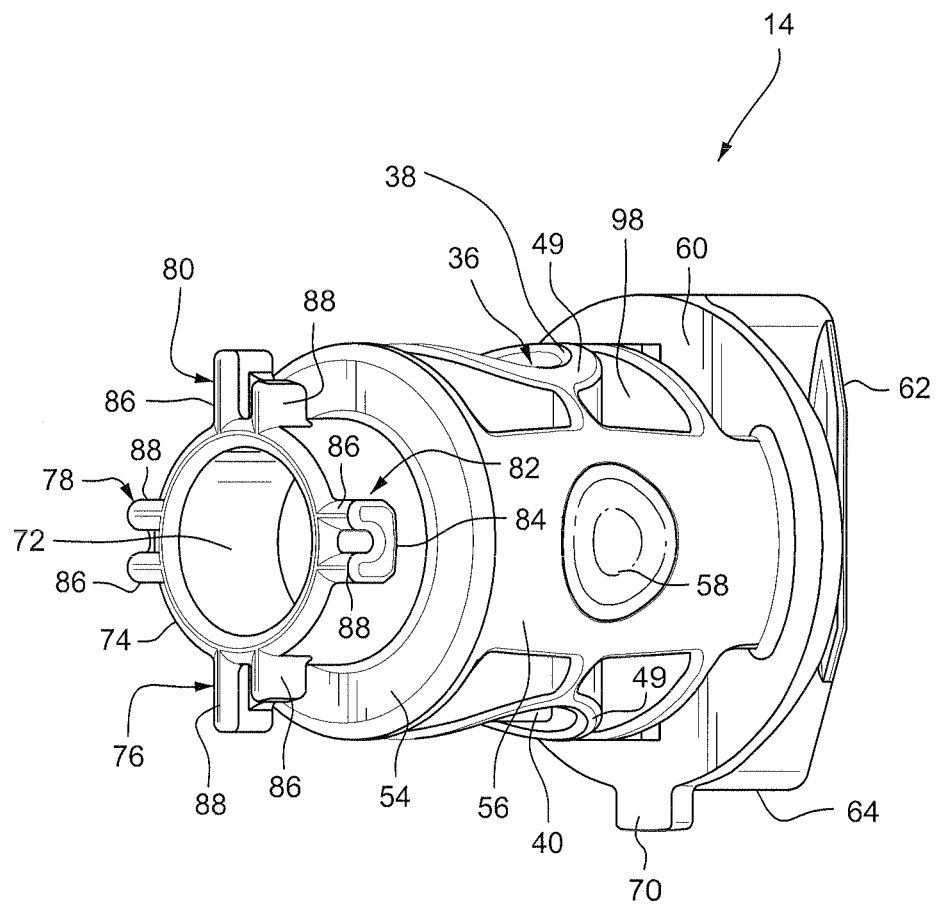
FIG. 3 is a left side, rear perspective view of the nozzle insert shown in FIG. 2.
Figure 4:
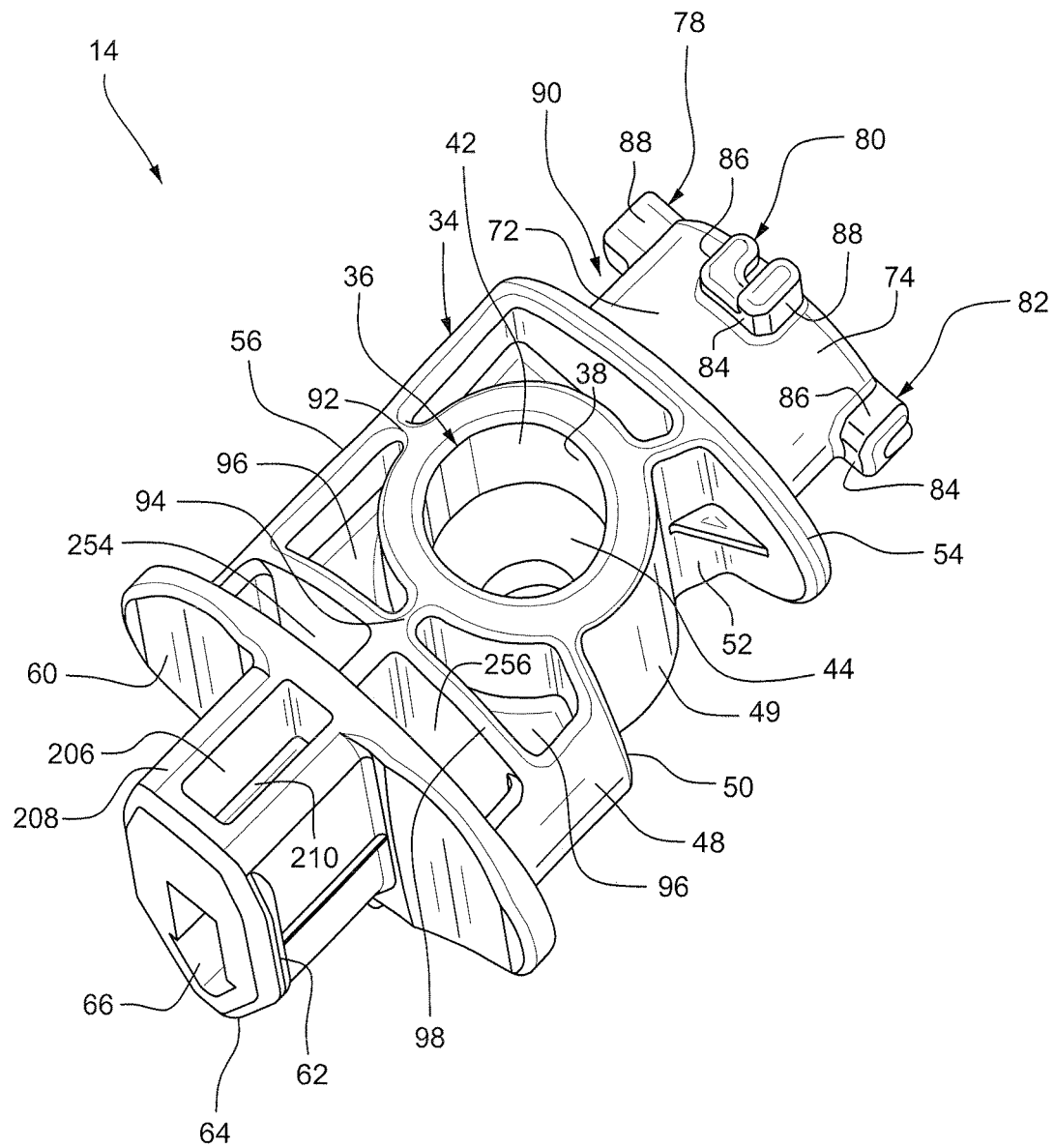
FIG. 4 is a right side, top perspective view of the nozzle insert shown in FIG. 2.
Figure 5:
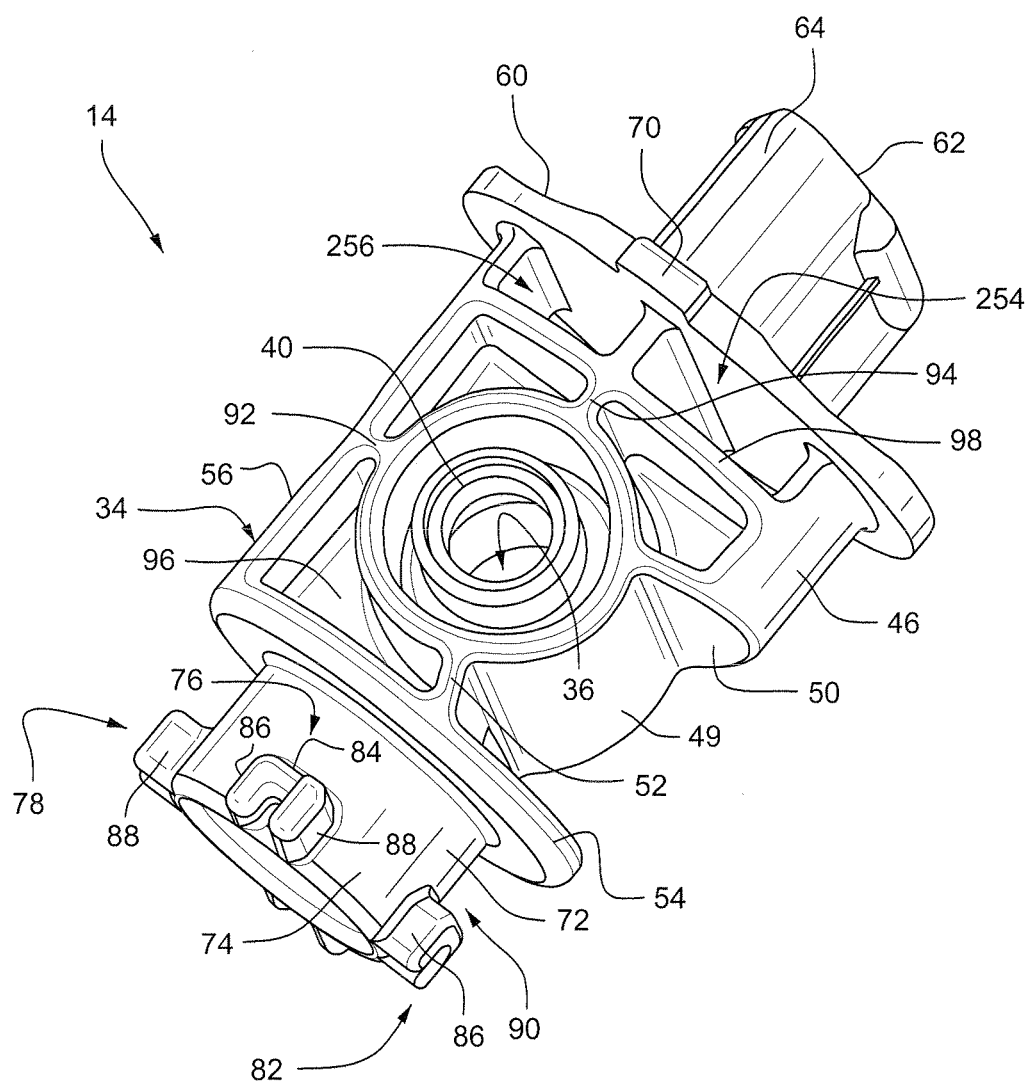
FIG. 5 is a right side, bottom perspective view of the nozzle insert shown in FIG. 2.
Figure 13:
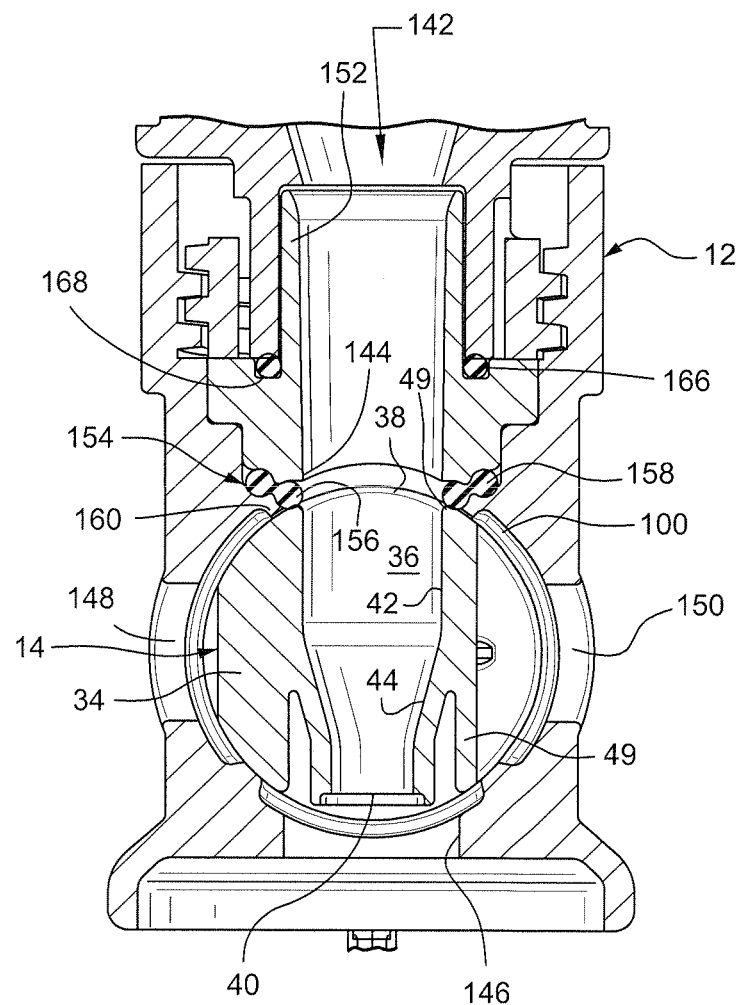
FIG. 13 is a partial vertical cross section viewed from the front of the sprinkler body and nozzle insert as shown in FIG. 11.

The insert body 34 is formed with a nozzle bore 36 which, in the illustrated embodiment, extends transversely of the insert axis or axis of rotation A from an inlet end 38 to an outlet end or nozzle outlet orifice 40. As best seen in FIGS. 4 and 13, the nozzle bore 36 is comprised of a straight relatively larger-diameter portion 42 extending from the inlet end 38, and an inwardly-tapered portion 44 extending from a location about midway between the inlet end and outlet end, and leading to the smaller-diameter nozzle orifice 40. Note that, because of the internal nozzle bore shape, the outer nozzle bore wall 49 is radially spaced from the orifice 40 at the outlet end of the nozzle bore as seen, for example, in FIGS. 1-3, 13, 23 and 23A.

As best seen in FIGS. 2-5, a "flush groove" 46 extends across a first axially-extending solid peripheral portion 48 of the insert body, substantially parallel to the nozzle bore 36 in the illustrated embodiment. The flush groove 46 is defined by the nozzle bore wall 49, a first side wall 50 and a second side wall 52 that intersects and is extended by a rearward end wall 54 of the cylindrical insert body 34. The flush groove 46 communicates with a sprinkler body flow passage when the nozzle insert is rotated to the NOZZLE FLUSH position as described further herein in order to direct any debris in the sprinkler body flow passage laterally away from the sprinkler body, and thus also preventing any such debris from entering the nozzle bore.

A second axially-extending, solid peripheral portion 56 (FIG. 3) of the insert body 34 is circumferentially spaced from, and preferably diametrically opposite the first solid peripheral portion 48 and is formed with a round concave surface 58 to reduce seal drag when the insert body is rotated. When the nozzle insert 14 is rotated to the OFF position (see FIG. 19), a seal 154 engages the solid peripheral portion 56 surrounding the concave surface 58 as also described further herein.

The insert body 34 is also formed with a forward, disk-like end face or wall 60 that, in the exemplary embodiment, is round in shape, with a diameter larger than the diameter of the remainder of the insert body 34 (including the rearward end wall 54). The forward end wall 60 is formed or provided on its outward side with a relatively narrow but easily grasped turning knob 62, which extends centrally across the end wall 60 and through the insert axis A. As shown, the turning knob 62 is tapered to a rounded point 64 at one end and thus also serves as a pointer device that indicates the rotational position of the nozzle insert 14 as indicated by position indicia, e.g., ON, OFF, NOZZLE FLUSH and FLUSH on the sprinkler body 12 at locations corresponding to the four operation positions of the nozzle insert. (Note that the FLUSH indicator on the sprinkler body is also referred to herein as a LINE FLUSH position to more clearly distinguish it from the NOZZLE FLUSH position). To reinforce this positional aspect of the turning knob 62, an arrow-like indicator 66 may be formed within or on the knob, oriented to match or align with the pointing direction of the knob. Because the indicator 66 is formed as a slot in the illustrated embodiment, it will accept a standard flat-blade screwdriver for situations where extra turning torque may be required due to impacted sand, etc. A nozzle orifice size reference number 68 (see for example, FIGS. 1, 2, 7 and 8) may also be provided on the knob 62 above the arrow-like indicator 66, providing the user with a clear indication of the nozzle orifice size. It will be appreciated that the nozzle orifice size number could be placed in any readily visible location on the nozzle insert 14, but preferably on the outwardly facing surface of the forward end wall 60 or on the knob 62 itself (as shown). The nozzle inserts may also be color-coded by orifice size. In addition, the arrow-like indicator 66 as well as the nozzle orifice size reference number 68 could be provided in the form of separately-applied adhesive labels or the like.

It will also be appreciated that because the forward end wall 60 is larger in diameter than the insert body 34, it will serve to shield the user from water spray that may be directed toward the user when the nozzle insert is rotated between its operating positions, or when the nozzle insert is in the NOZZLE FLUSH or LINE FLUSH positions.

It will also be appreciated that other reference markings or indicia may be applied to the front face of the insert body 34. For example, a sprinkler number corresponding to a sprinkler installation location along a truss span could be applied on one side of the turning knob 62 (or other suitable location) to assist in installing sprinklers with correct nozzle sizes in the desired sequence along a center-pivot truss span or the like. In this regard, sprinklers as described herein may be delivered to the customer slidably mounted on a string or wire in a suggested installation sequence as verified by the location numbers on the sprinklers. To this end, openings in the insert body 34 may be utilized for stringing together a series of nozzle inserts.

A stop tab 70 projects radially away from the forward end wall 60, in radial alignment with the tapered, rounded point 64 on the knob 62. This stop tab assists in the alignment of the insert 14 relative to the sprinkler body 12 for insertion, and also serves as a stop, preventing rotation of the nozzle insert 14 in one of two rotation directions from the insertion position, and preventing further rotation in the other of the two rotation directions at an opposite end of the rotational range of motion of the nozzle insert as described further herein.

As noted above, the insert body 34 has a rearward, disk-like end wall 54 of smaller diameter than the forward end wall 60, but of substantially the same diameter as the solid, diametrically-opposed peripheral portions 48, 56. A hollow, substantially cylindrical extension 72, concentric with the insert body 34 and insert axis A, extends away from the rearward end wall 54. At the distal end 74 of the substantially cylindrical extension 72, there are four index tabs 76, 78, 80 and 82 (best seen in FIGS. 3 and 4) extending radially outwardly at 90-degree intervals about the distal end 74 of the substantially cylindrical extension 72. Each index tab has a rounded U-shape when viewed in plan, including a front face 84, and a pair of spaced, substantially-parallel and rearwardly-extending stems 86, 88. For convenience, the reference numbers 84, 86 and 88 are used with each of the index tabs, noting that the separate numbers for the four index tabs per se facilitate the description of the rotation of the nozzle insert 14 from the INSERTION position through four additional indexed operating positions. Note that all the index tabs have similar width dimensions as defined by front faces 84, and similar cross-sectional shapes. Two of the index tabs, i.e., diametrically-opposed tabs 76 and 80, have a different geometry than the remaining two tabs. Specifically, stems 88 and 86 (see FIG. 2), of tabs 76 and have greater radial length dimensions, and these extended stems are substantially radially aligned as best seen in FIG. 3. As described further below, the extended stems, in combination with matching insert slots formed in the sprinkler body, ensure foolproof, one-way-only insertion of the nozzle insert 14 into the sprinkler body 12.

By locating the index tabs 76, 78, 80 and 82 at the distal end 74 of the substantially cylindrical portion 72, an axial gap 90 (see FIGS. 4 and 5) is established between the index tabs and the rearward end wall 54. Also note that index tab 76 is aligned with stop tab 70.

Between the forward end wall 60 and the rearward end wall 54 are various structural surfaces/ribs that serve to strengthen the insert body and/or that provide bearing surfaces when the nozzle insert 14 is installed in the recess 16 in the sprinkler body 12. For example, referring especially to FIGS. 4 and 5, at the nozzle bore inlet 38 the nozzle bore wall 49 is strengthened by radially-extending ribs 92, 94 that extend along substantially the entire length of the nozzle bore, on either side of a center web 96 extending between the rearward end wall 54 and the similarly-sized disk-like wall 98 located behind and adjacent the forward end wall 60. Rib 94, as well as solid peripheral portions 48, 56 extend beyond the wall 98 and join to the back side of the forward end wall 60. Note that the sides 50 and 52 of the flush groove 46 also extend from and reinforce the nozzle bore wall 49 along the length of that wall. The rearward end wall 54 and the similarly sized and shaped wall 98, along with peripheral portions 48, 56 provide bearing surfaces for the insert 14 as it rotates within the sprinkler body 12 as explained further herein. It will be understood that the location and configuration of the various reinforcement ribs are determined at least in part by manufacturing considerations, especially if the insert is of molded plastic construction and, as such, are not intended to limit the scope of the invention. Openings created between the forward end wall 60 and wall 98, and as further defined by the rib 94 and peripheral wall portions 48, 56, permit stringing together of multiple nozzle inserts as mentioned above.

Note that the sides 50 and 52 of the flush groove 46 also extend from and reinforce the nozzle bore wall 49 along the length of that wall. The rearward end wall 54 and the similarly sized and shaped wall 98, along with peripheral portions 48, 56 provide bearing surfaces for the insert 14 as it rotates within the sprinkler body 12 as explained further herein. It will be understood that the location and configuration of the various reinforcement ribs are determined at least in part by manufacturing considerations, especially if the insert is of molded plastic construction and, as such, are not intended to limit the scope of the invention.

Figure 2:
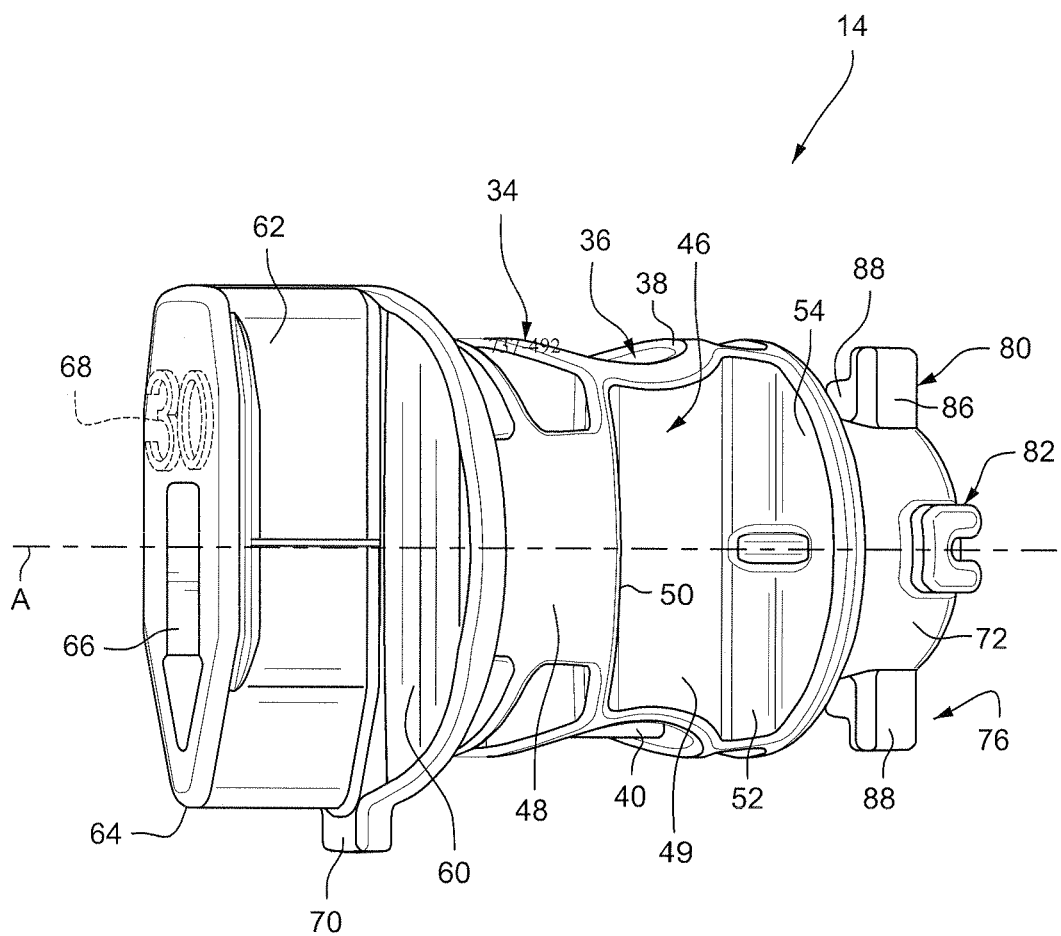
FIG. 2 is a right side, front perspective view of the nozzle insert shown in FIG. 1.
Figure 6:
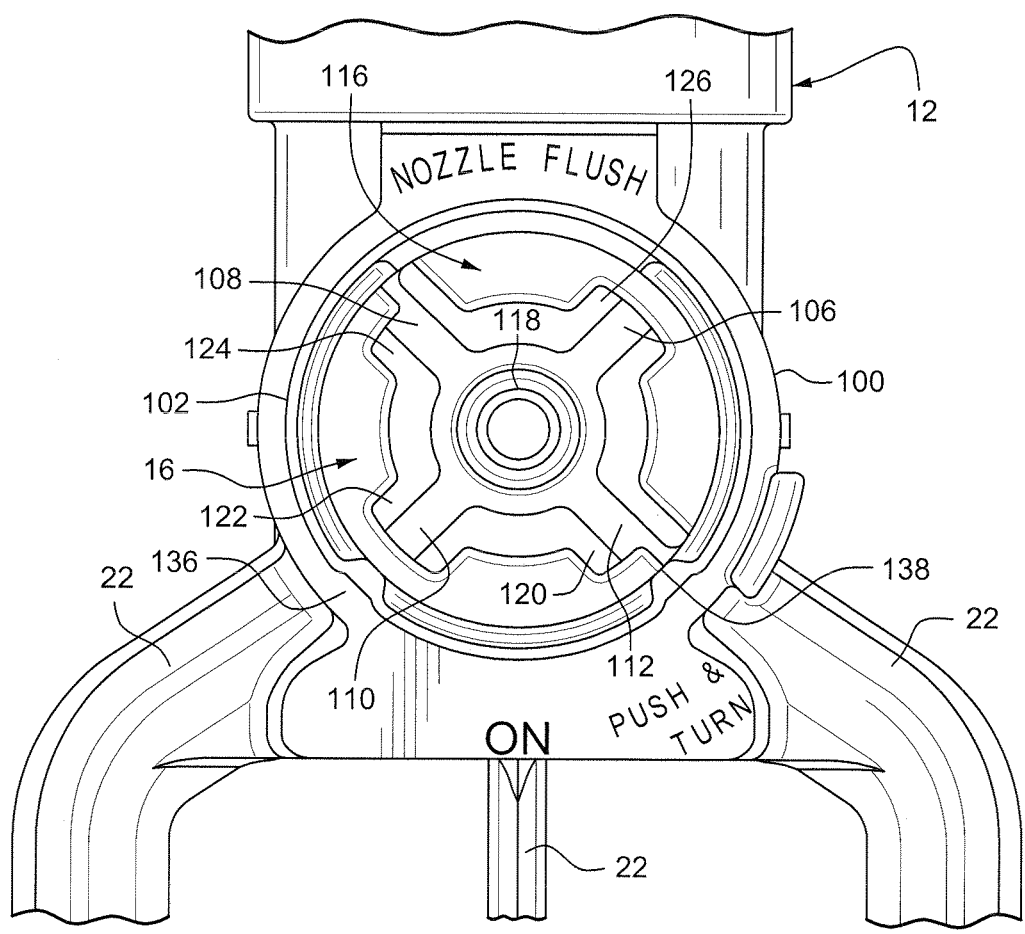
FIG. 6 is an enlarged, partial front elevation view of the sprinkler body with the nozzle insert removed.
Figure 7:
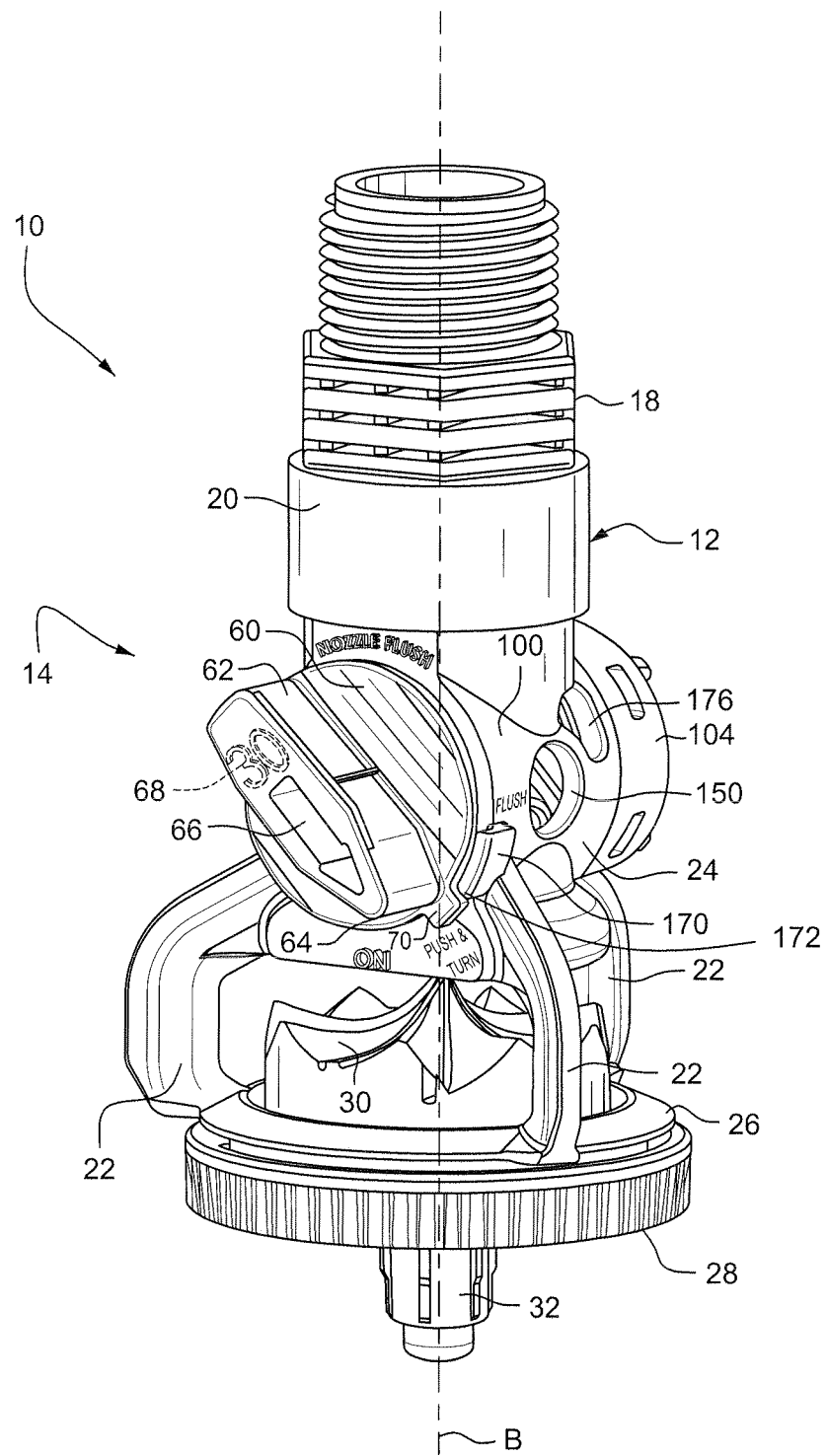
FIG. 7 is a perspective view similar to FIG. 1 but with the nozzle insert installed within the sprinkler body in the INSERTION position.
Figure 8:
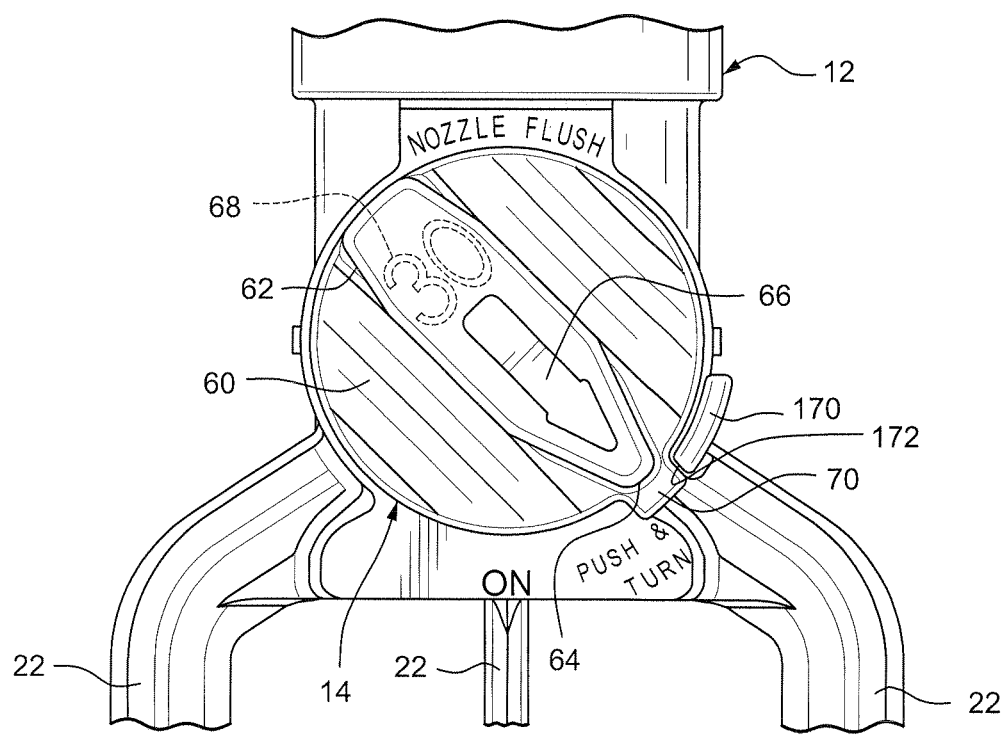
FIG. 8 is an enlarged, partial front view of the sprinkler body and nozzle insert as shown in FIG. 7.
Figure 9:
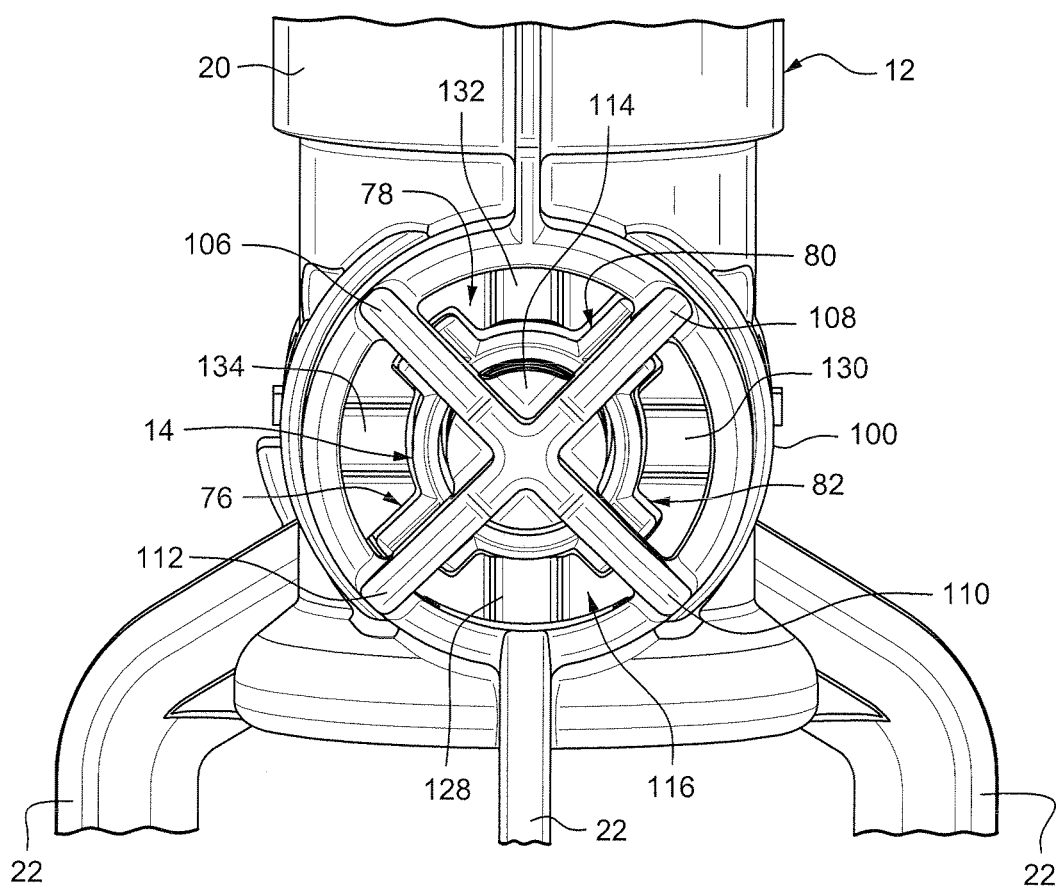
FIG. 9 is an enlarged, partial rear view of the sprinkler body and nozzle insert shown in FIG. 5.

Returning to FIG. 1 and with additional reference to FIGS. 6, 7 and 9, the sprinkler body recess 16 is defined by a substantially-cylindrical wall 100 concentric with the insert axis or axis of rotation A (see FIG. 2). The recess 16 is open at a forward end 102 as viewed in FIG. 1 and partially closed at a rearward end 104 by four, equally-spaced, radially-oriented struts 106, 108, 110 and 112, joined at a center hub 114 (FIG. 9). An internal radial flange or collar 116 is located adjacent but axially spaced forwardly of the struts 106, 108, 110 and 112. The flange 116 is substantially axially-aligned with a distal end of a substantially cylindrical spring support 118 extending forwardly of the center hub 114. The flange 116 is formed with four radially-oriented insert slots 120, 122, 124 and 126 that are spaced and oriented to mate with and receive the four index tabs 76, 78, 80 and 82, respectively, on the insert body 34. Note that the shapes of slots 120 and 124 match the shapes of the index tabs 76 and 80, respectively that have stems with extended radial length dimensions. As noted above, with this arrangement, insertion of the insert body 34 into the sprinkler body recess 16 can only be achieved in one orientation of the insert body, i.e., with tabs 76, 80 aligned with insert slots 120 and 124. This orientation of the nozzle insert 14 relative to the sprinkler body 12 is referred to herein as the INSERTION position. Upon insertion, the axial gap 90 between the index tabs and the rear end wall 54 is able to receive the flange 116, and the gap between the flange 116 and the struts 106, 108, 110 and 112 permits the index tabs 76, 78, 80 and 82 to rotate behind the flange 116.

On the back side of the flange 116 (i.e., the side facing the struts 106, 108, 110 and 112), there are four substantially identical index notches 128, 130, 132 and 134 (FIG. 9), located circumferentially between the insert slots 120, 122, 124 and 126 and sized to receive any one of the index tabs 76, 78, 80 and 82. As explained in greater detail below, after insertion, the nozzle insert 14 may be rotated from the INSERTION position to any of four additional operating positions, as defined by the locations of the index notches 128, 130, 132 and 134. It will be appreciated that in other versions, the index tabs and index notches may be reversed, such that the tabs are located on the flange 116 and the notches are located, for example, on forward faces of radial projections, formed on the cylindrical portion 72.

Within the recess 16, there is a pair of substantially-parallel elongated ribs 136, 138 that extend internally along the wall 100, parallel to axis A. These ribs provide bearing surfaces for the insert body 34 during insertion and subsequent rotation of the nozzle insert 14 between its various operating positions. As will be appreciated, ribs 136, 138 also help center or align the insert 14 within the recess 16 in addition to minimizing surface friction during rotation.

As noted above, a generally-cylindrical spring support 118 extends forwardly of the center hub 114. A coil spring 140 is received over the spring support and lies on the insert axis A. The forward end of the spring 140 engages the center portion of the rearward end wall 54, inside the substantially cylindrical portion 72, and thus exerts a force on the insert body 34 in a direction opposite the insertion direction. It will be appreciated that various spring-mounting/retaining arrangements as well as other spring types may be employed and remain within the scope of the invention.

Figure 14:
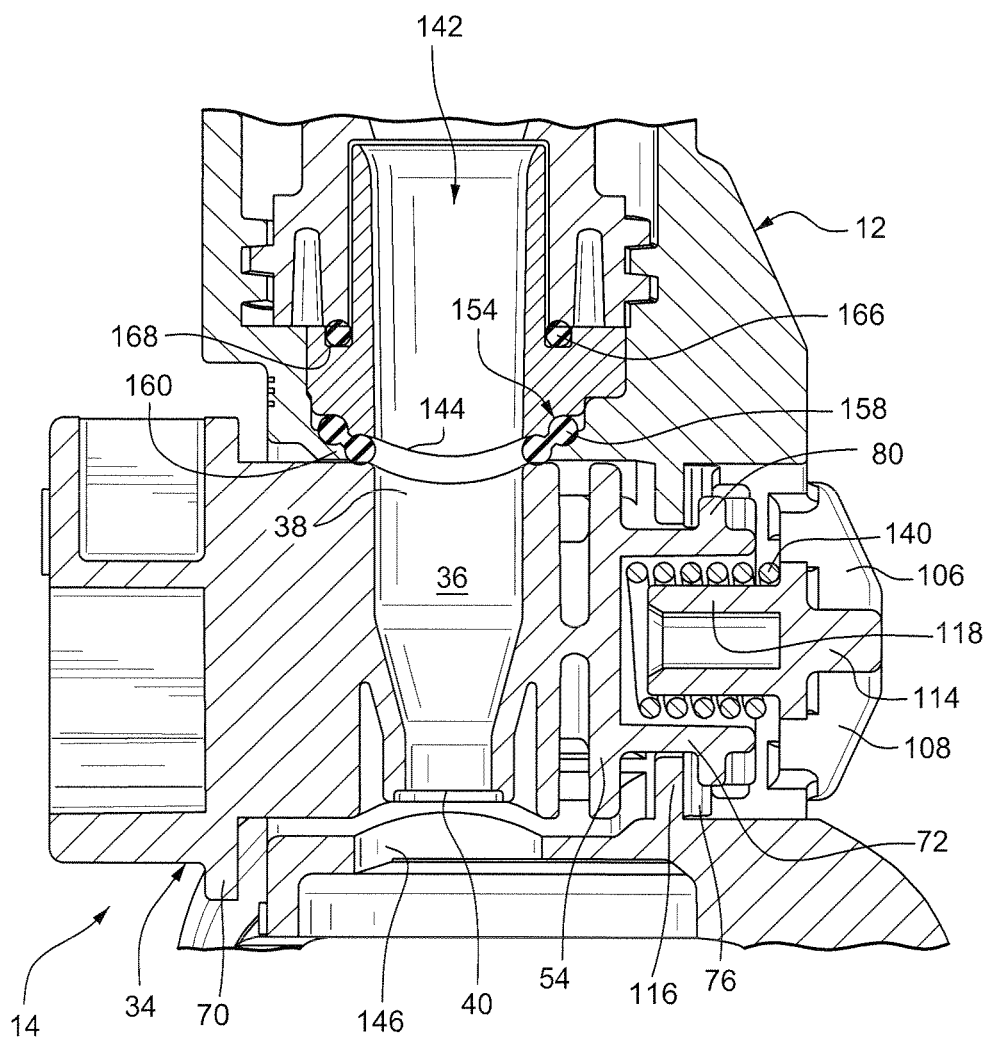
FIG. 14 is a partial vertical cross section viewed from the right side of the sprinkler body and nozzle insert as shown in FIG. 11.

With reference to FIGS. 13 and 14, an inlet end of the sprinkler body 12 is formed with a flow passage 142 including a first aperture 144 concentric with the sprinkler body axis B and that opens in the wall 100 so as to align with the nozzle bore 36 when the nozzle insert 14 is in the ON position. An outlet end of the sprinkler body is formed with an aperture 146 axially aligned with aperture 144 that aligns with the nozzle orifice 40 when the nozzle insert is in the same ON position.

The sprinkler body 12 is also formed with nozzle bore access apertures or openings 148, 150 (see e.g., FIGS. 1, 13, 18, 26), preferably on diametrically-opposed sides of the wall 100, transverse to both the insert axis A and the sprinkler axis B as described further below. When the nozzle insert 14 is in either the OFF position or the LINE FLUSH position, the nozzle bore 36 is aligned with the openings 148, 150 providing ready access to the nozzle bore for manual cleaning in the event debris is tightly wedged in the nozzle bore and not able to be flushed out in the NOZZLE FLUSH position.

Figure 27:
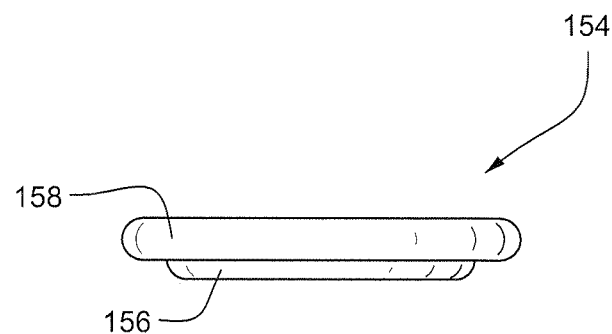
FIG. 27 is a side elevation of a seal employed between the sprinkler body and nozzle insert in the first exemplary embodiment.
Figure 28:
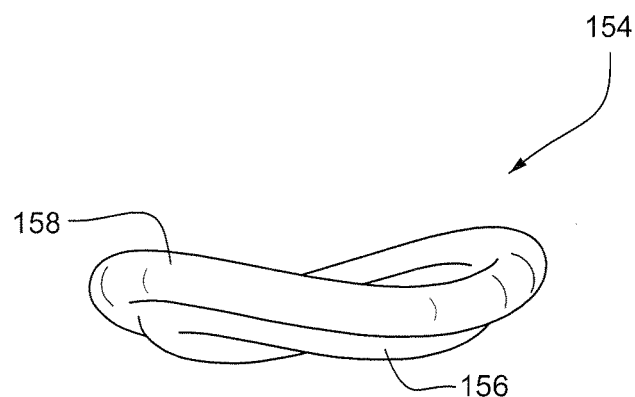
FIG. 28 is a perspective view of the seal shown in FIG. 27, but illustrating a shape of the seal when installed.

A seal retainer sleeve 152 is mounted in the flow passage 142 and cooperates with the edge of the aperture 144 to mount a relatively soft, rounded seal 154 engageable with the contoured edge of the bore wall 49 at the inlet end 38 of the nozzle bore 36 as described further herein (see FIGS. 13, 14). FIGS. 27 and 28 illustrate the seal 154 in isolation. FIG. 27 shows a side elevation of the seal 154 in a normal uninstalled state, where the otherwise flexible seal assumes a substantially planar orientation. The seal 154 may be characterized as a "double O-ring" seal including joined inner and outer ring portions 156, 158, which enable secure attachment about the outer ring 158, while allowing flexing of the inner ring portion 156 to conform to the surface of the insert body 34, i.e., the surface surrounding the nozzle bore 36 at the inlet end 38. FIG. 28 illustrates the shape assumed by the seal when installed, conforming to the cylindrical shape of the insert body 34. In addition, the "double o-ring" configuration is particularly advantageous in that, as the nozzle insert body 34 rotates across the seal, the inner ring portion 156 conforms to the surface of the nozzle insert body, while the rounded shape of the inner ring portion reduces the likelihood of excessive friction that might otherwise lead to tears or other undesirable surface abrasion. At the same time, the relatively soft, flexible material provides an effective seal with only a light compression force. Traditional ball and plug valves use hard seals with high compression loads required to effect the seal, resulting in a further need for a relatively large and otherwise undesirable handle to overcome the friction.

Figure 29:
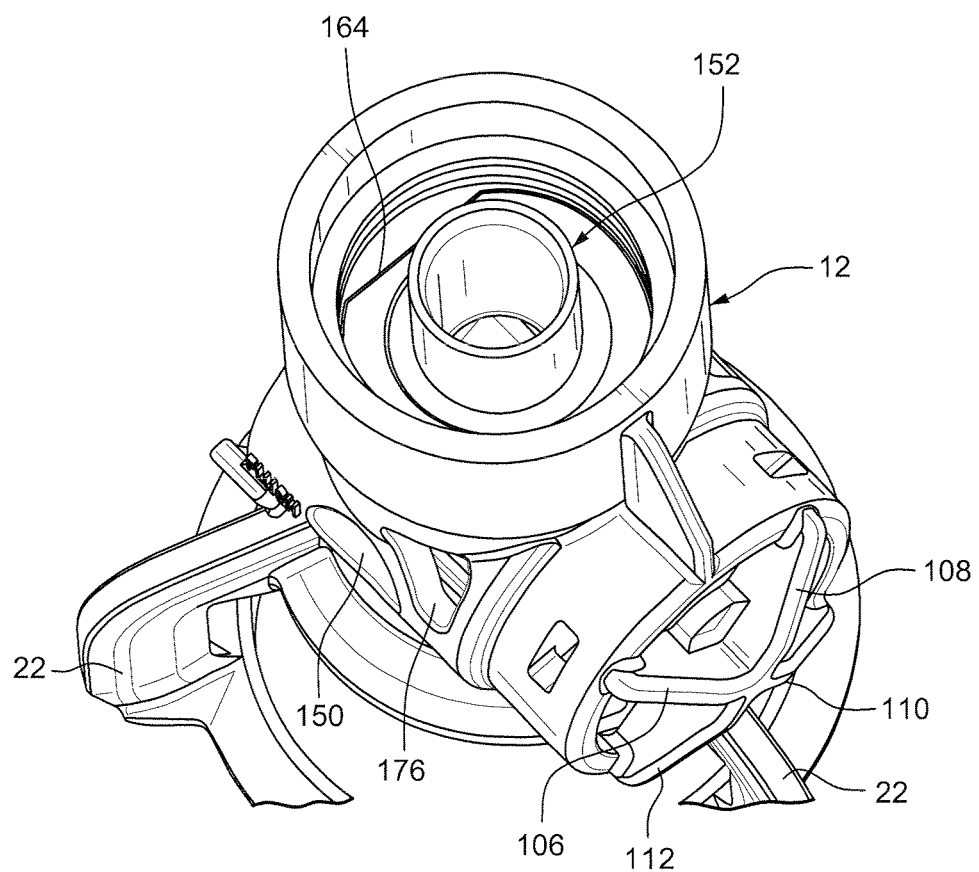
FIG. 29 is a top perspective view of a sprinkler body and seal retainer sleeve employed in the sprinkler body as shown in FIGS. 1-26.
Figure 30:
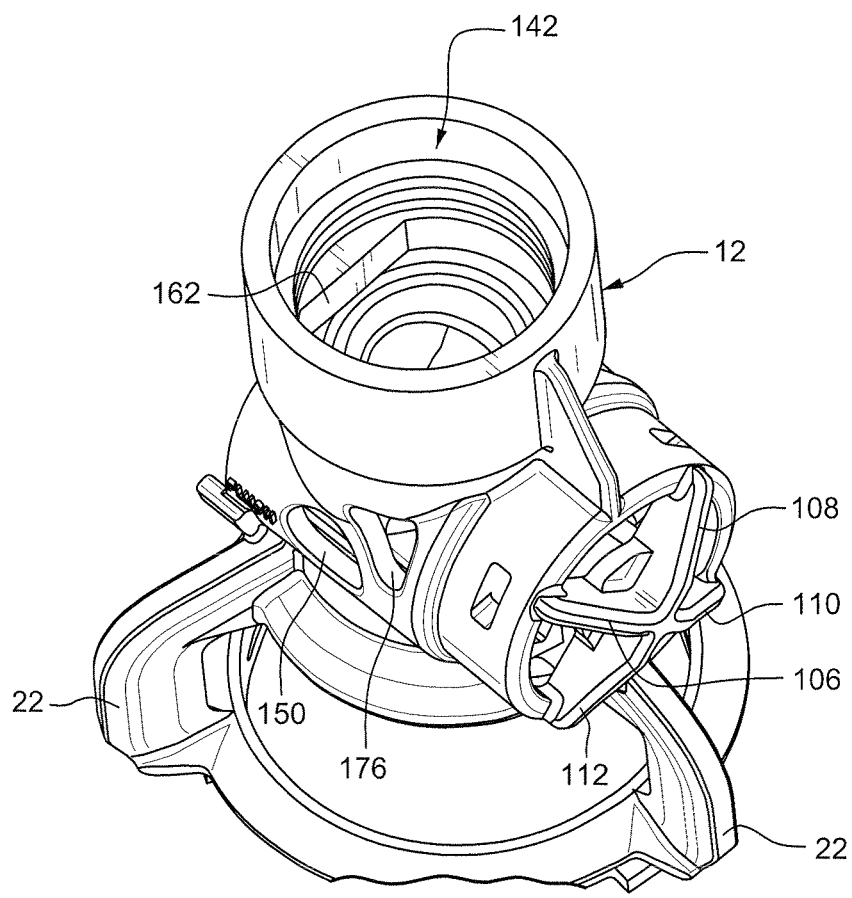
FIG. 30 is a top perspective view of the sprinkler body as shown in FIG. 27 but with the seal retainer sleeve removed.

FIG. 29 shows the seal retainer sleeve 152 mounted within the flow passage 142 in the sprinkler body. The seal retainer sleeve 152 supports the seal 154 about its outer peripheral edge 158 (see FIGS. 13, 14, 19, 23 and 25), and effectively clamps the seal 154 between the lower edge of the seal retainer sleeve 152 and a radial flange 160 surrounding and defining the aperture 144. Note that the lower end of the seal retainer sleeve is also shaped to conform to the inlet end 38 of the nozzle bore 36. As noted above, this arrangement allows the inner portion 156 of the seal to flex as needed to conform to the curvature of the insert body 34. FIG. 30 shows the interior of the sprinkler body 12 and especially the flow passage 142, including a flat 162 that mates with a corresponding flat 164 on the retainer sleeve 152, facilitating proper alignment and installation of the seal retainer sleeve within the flow passage 142. Note that the retainer sleeve 152 is held in place by the adapter 18, and that an additional annular seal 166 (e.g., an o-ring seal) may be inserted in a groove 168 in the seal retainer sleeve thereby preventing leakage at the sleeve/adapter interface.

A tab 170 extends axially from the forward edge of wall 100 and cooperates with the stop tab 70 to initially assist in alignment of the nozzle insert 14 with the sprinkler body 12 in the INSERTION position, and to then also limit rotation of the insert 14 to rotation in a clockwise direction from the INSERTION position through the four indexable operating positions. In other words, at the fourth position (the LINE FLUSH position), the nozzle insert 14 can be rotated no further in the clockwise direction, and must be rotated in a counterclockwise direction to return to any one of the other three operating positions and/or to return to the INSERTION position if it is desired to remove the nozzle insert 14 from the sprinkler body 12.

The sprinkler body is also provided with aligned apertures 174, 176 which align with the flush groove 46 when the nozzle insert is rotated to the LINE FLUSH position.

Operation

Figure 10:
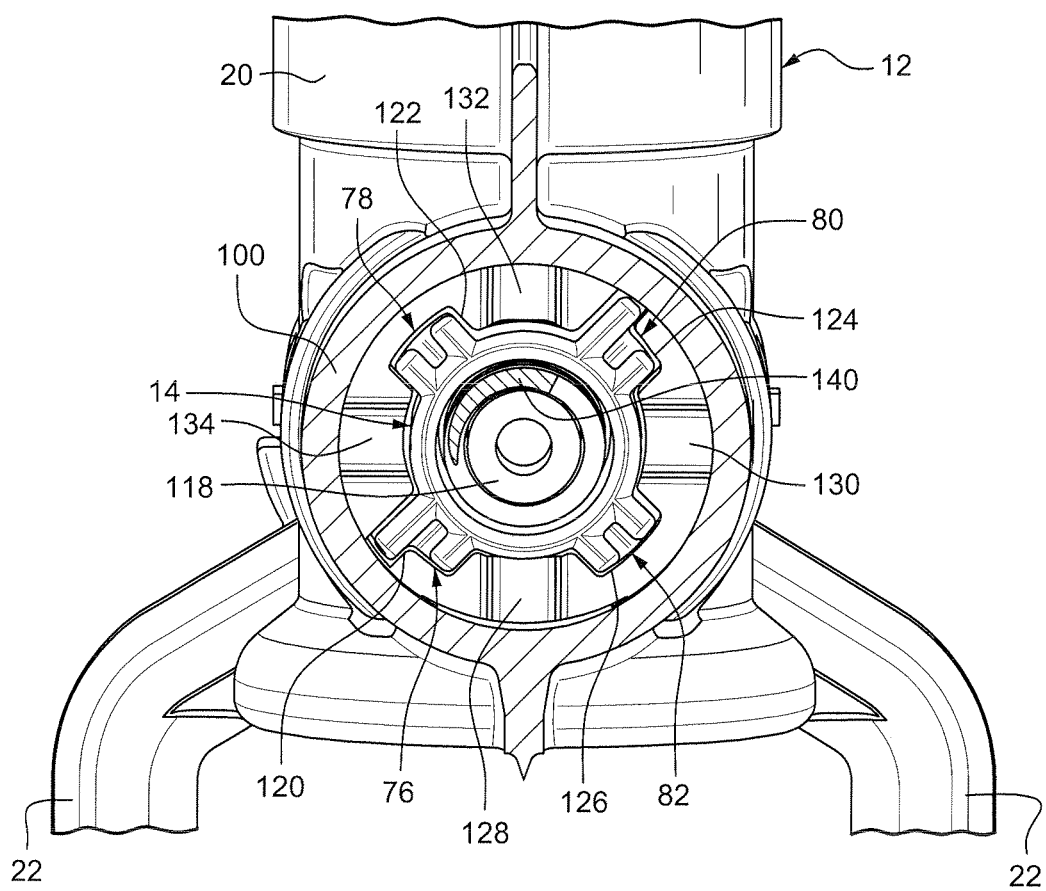
FIG. 10 is a view similar to FIG. 9 but partially sectioned to remove the struts at the back end of the sprinkler body.
Figure 11:
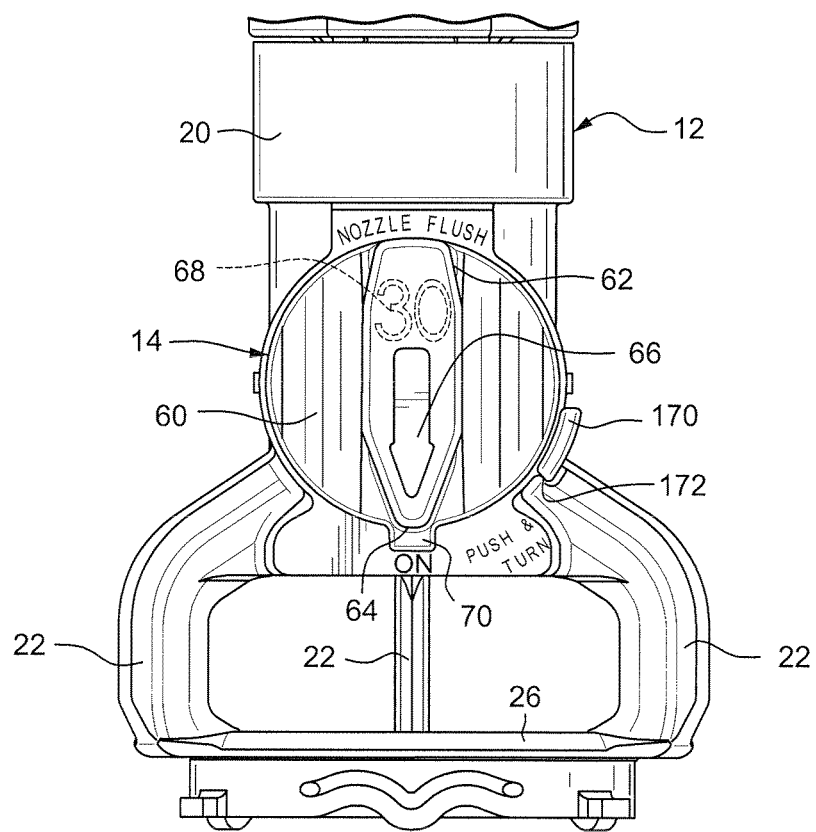
FIG. 11 is a front elevation view of the sprinkler body and nozzle insert (with the water deflection plate removed), with the nozzle insert rotated in a clockwise direction from the INSERTION position to the nozzle ON position.
Figure 12:
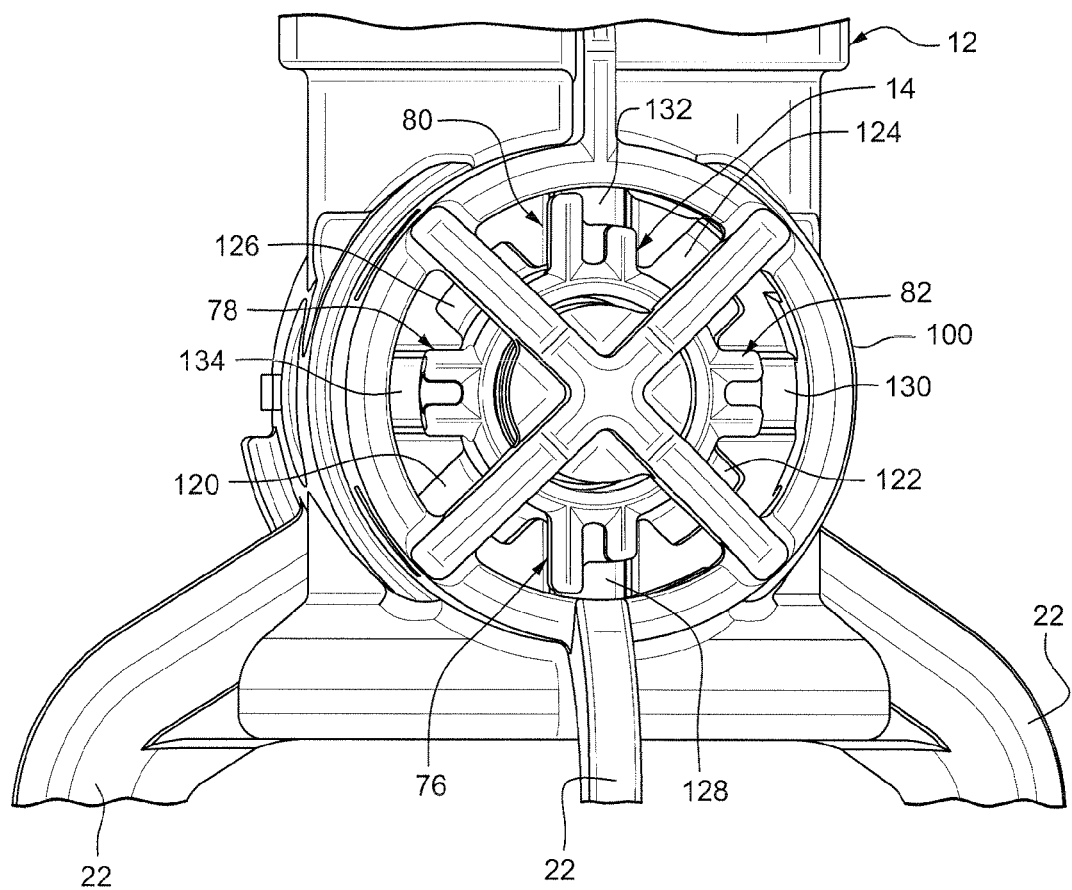
FIG. 12 is an enlarged partial rear view of the sprinkler body and nozzle insert as shown in FIG. 11.

FIG. 1 illustrates the orientation of the nozzle insert 14 relative to the sprinkler body 12 required for insertion (i.e., in the INSERTION position). When the insert body 34 is properly aligned, with tab 70 engaging lower edge 172 of the stop 170 (FIGS. 7 and 8) the index tab 76 is automatically aligned with the insert slot 120 (FIGS. 9 and 10), permitting insertion of the nozzle insert 14 into the sprinkler body 12, with all the index tabs passing through respective insert slots in the radial flange 116. The nozzle insert 14 is shown fully inserted into the complementary recess 16 in the sprinkler body 12 in FIGS. 7-10. Specifically, and as best seen in FIG. 10, the extended-length index tabs 76 and 80 have passed through the matching insert slots 120 and 124, while index tabs 78, 82 have passed through the remaining insert slots 122, 126 (FIG. 10). It will be understood that the spring 140 provides some resistance to the insertion, but the resistive force is necessary to insure good engagement of the index tabs in respective ones of the index notches 128, 130, 132 and 134 on the backside of the flange 116 as described further below. Once the insert is rotated slightly in the clockwise direction, and as the index tabs engage the backside of the radial flange 116, the insert 14 is retained within the recess 16 so that it will not be pushed out of the recess until and unless the insert is returned to the INSERTION position.

Figure 18:
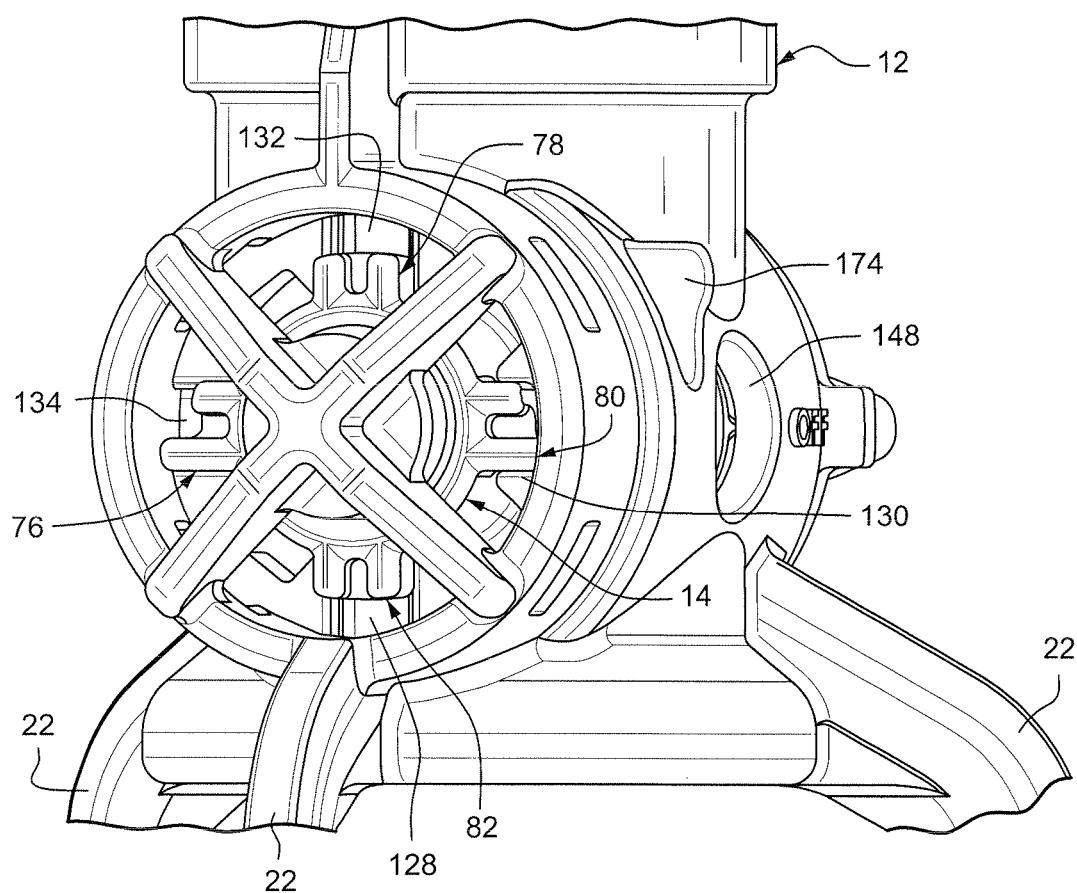
FIG. 18 is an enlarged, partial left side, rear perspective view of the sprinkler body and nozzle insert as shown in FIG. 17.

Note that the sprinkler body 12 is provided with indicia on its forward wall 60 and/or on the wall 100 that indicate the various operating positions of the nozzle insert 14. As best seen in FIGS. 1, 7 and 18 the operating positions are indicated by the indicia PUSH & TURN (for the INSERTION position), ON, OFF (FIG. 18), NOZZLE FLUSH and FLUSH (for the LINE FLUSH position).

FIGS. 11-14 show the nozzle insert 14 rotated 45 degrees in the clockwise direction from the INSERTION position to the ON position. In the ON position, the nozzle bore 36 is axially-aligned with the apertures 144, 146 in the sprinkler body, with leakage prevented by the seal 154 at the inlet end 38 of the nozzle bore 36. As noted above, the inner ring 156 of the seal will engage and conform to the contour of the bore wall 49 at the inlet 38 to the nozzle bore 36, recognizing that the wall 100 is also cylindrical, and that the inner ring 156 of the seal conforms to the shape of the wall 100 and to the insert body 34 at the bore wall 49 (FIG. 13). At the outlet orifice 40, no seal is necessary because the nozzle orifice is of a lesser diameter than the sprinkler body outlet aperture 146 (FIG. 14), providing ample space for a stream emitted from the orifice 40 to pass through the aperture 146 and subsequently impinge on the deflector plate 28. In addition, note that the spring 140 continues to exert a force in a direction opposite the INSERTION direction and, in the ON position, the spring urges the index tabs 76, 78, 80 and 82 into the corresponding index notches on the rear face of the flange 116. Specifically, index tab 76 is seated in index notch 128; index tab 78 is seated in index notch 134; index tab 80 is seated in index notch 132 and index tab 82 is seated in index notch 130 (see FIG. 12). Note that because the index tabs 76 and 80 are radially longer than the remaining index tabs 78 and 82, the nozzle insert will be retained within the sprinkler body recess as it rotates between its various operation positions. In addition, as the nozzle insert 14 rotates between operational positions, the rotation movement itself is facilitated by the beveled or angled edges of the index tab stems that interact with the edges of the index notches. The dimensions of the tabs and notches are such that the beveled edges engage the notch edges, preventing full seating of the tabs within the notches and facilitating rotation out of the operating positions even with the spring urging the index tabs toward the index notches.

Figure 15:
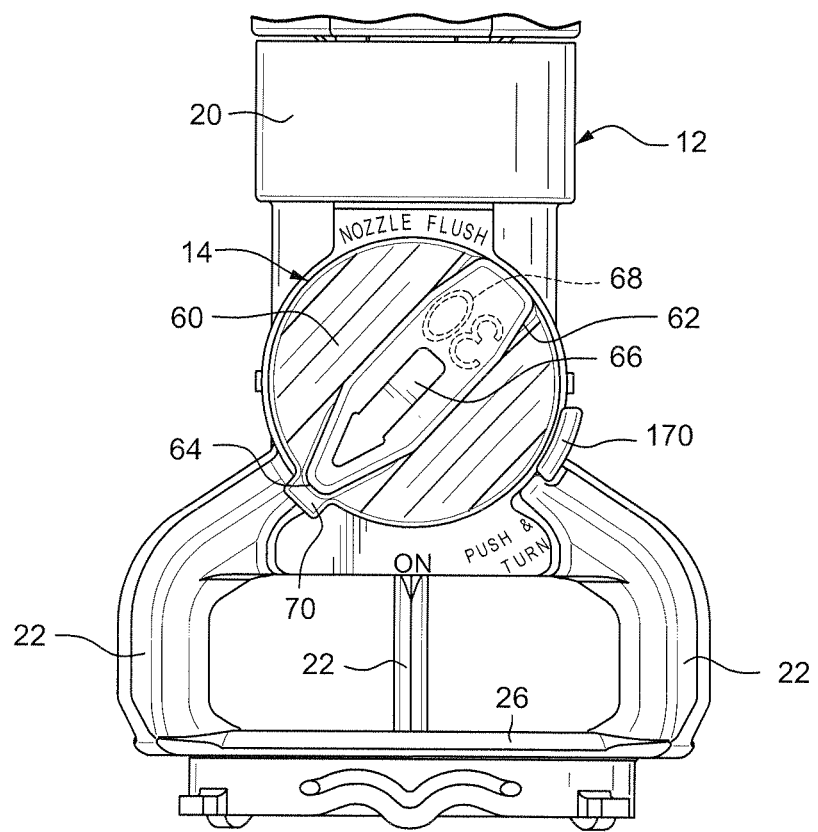
FIG. 15 is a front elevation view similar to FIG. 11 but with the nozzle insert rotated 45 degrees in a clockwise direction from the ON position to an intermediate position between the ON position and the OFF position.
Figure 16:
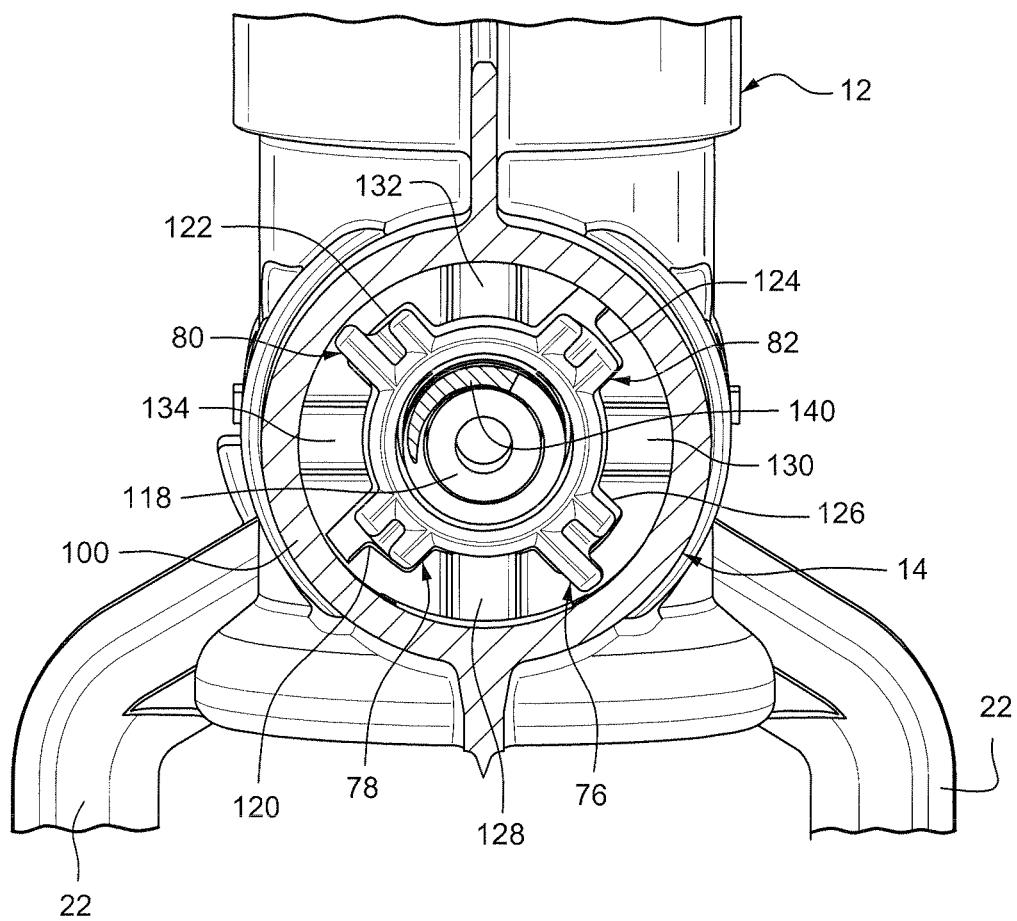
FIG. 16 is an enlarged, partial rear section view of the sprinkler body and nozzle insert as shown in FIG. 15.

FIGS. 15 and 16 illustrate the nozzle insert rotated about 45 degrees in a clockwise direction beyond the ON position to an intermediate position between the ON position and an OFF position. Here, the index tabs have rotated out of their respective index notches and are passing over the insert slots, moving counterclockwise as viewed in FIG. 16. Note that the extended stems on the index tabs engage the back side of the flange 116 and thus counter the force of the spring 140 even when the shorter stems align with respective insert slots. This arrangement also prevents escape of the nozzle insert 14 from the recess 16.

Figure 17:
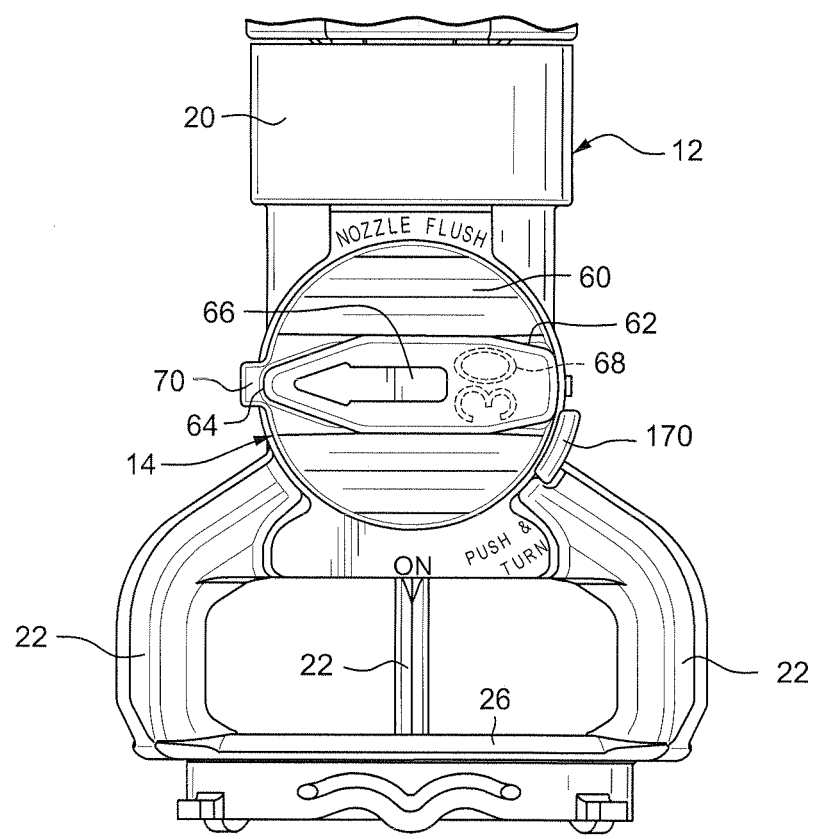
FIG. 17 is a front elevation view similar to FIGS. 11 and 15, but with the insert rotated 45 degrees in a clockwise direction from the intermediate position shown in FIG. 15 to the OFF position.
Figure 19:
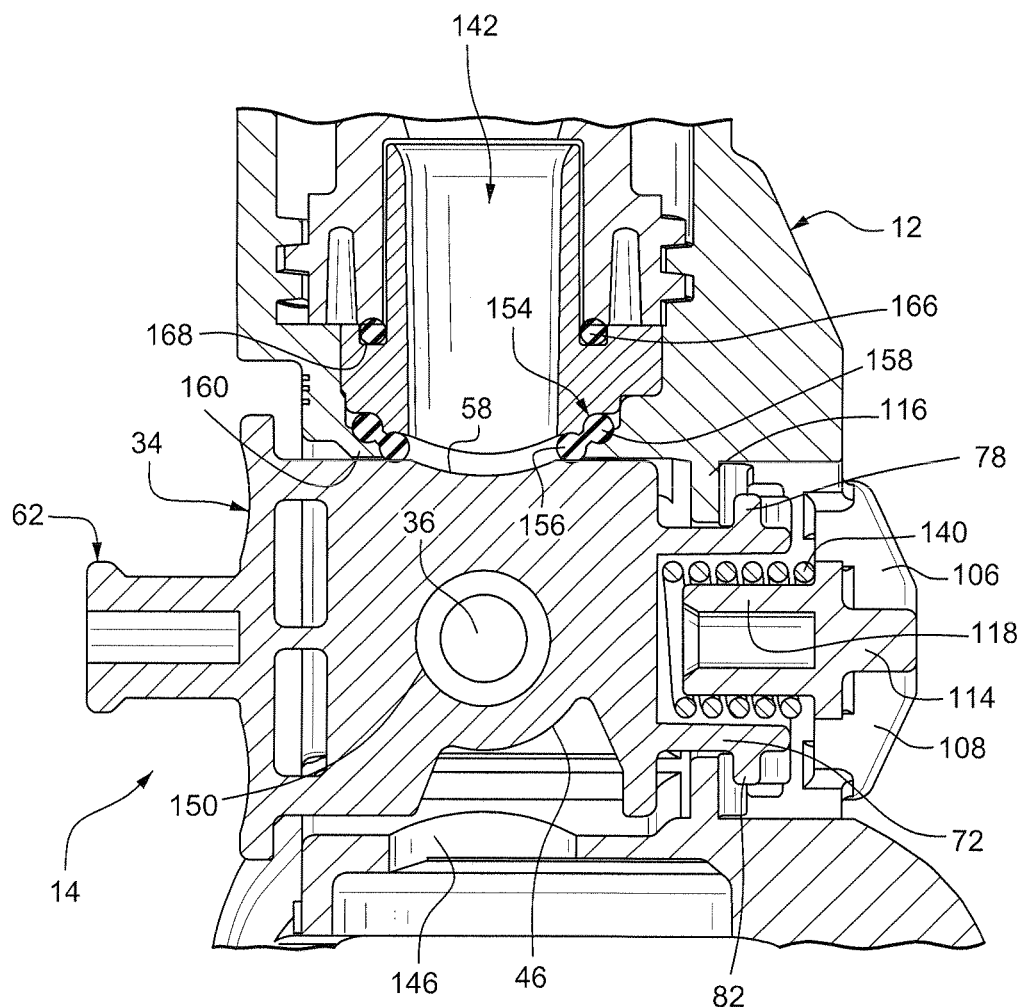
FIG. 19 is a partial vertical cross section viewed from the right side of the sprinkler body and nozzle insert as shown in FIG. 17.

FIGS. 17-19 illustrate the nozzle insert 14 rotated about 45 degrees further in the clockwise direction to the OFF position. In this position, and as best seen in FIG. 19, surface 56 and the concave surface 58 shut off flow through the sprinkler body flow passage 142, and surface 56 is sealed by the seal 154 to prevent leakage. In this position, the index tabs 76, 78, 80 and 82 are seated, respectively in index notches 134, 132, 130 and 128 (FIG. 18). In addition, the nozzle bore 36 is now aligned with the openings 148, 150 in the sprinkler body thus permitting the nozzle bore to be cleaned manually of any debris that is tightly wedged in the bore 36 and unable to be removed when the nozzle insert is rotated to the NOZZLE FLUSH position.

Figure 20:
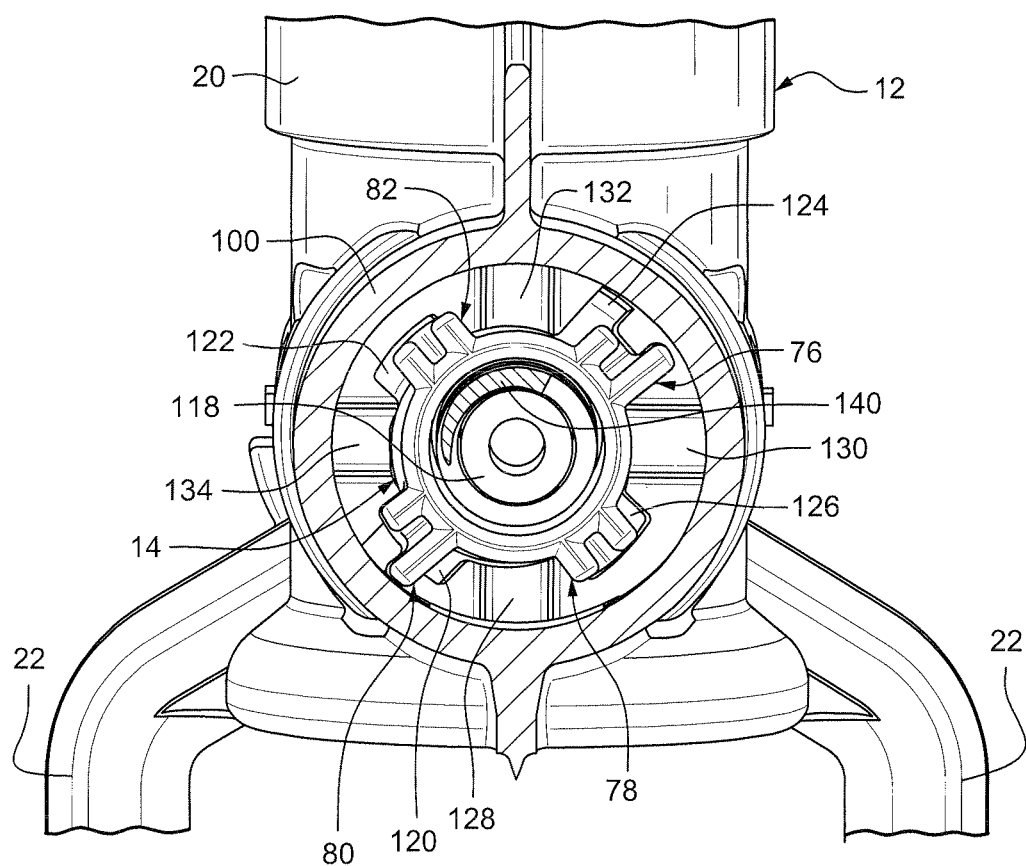
FIG. 20 is an enlarged, partial rear section view of the sprinkler body and nozzle insert as shown in FIG. 17, but with the insert rotated slightly less than or about 45 degrees in a clockwise direction from the OFF position to an intermediate position between the OFF position and the NOZZLE FLUSH position.

FIG. 20 is an enlarged, partial rear section view of the sprinkler body and nozzle insert, but with the insert rotated slightly less than or about 45 degrees in a clockwise direction (as viewed from the front) from the OFF position to an intermediate position between the OFF position and the NOZZLE FLUSH position. It can be seen that the index tabs have rotated out of their respective index notches as shown in FIG. 18, and here again, the mismatched index tabs ride across the back side of the flange 116; and because of the mismatch with the insert slots, the nozzle insert is not pushed forward by the spring 140 when the index tabs are circumferentially between the index notches on the back side of flange 116.

Figure 21:
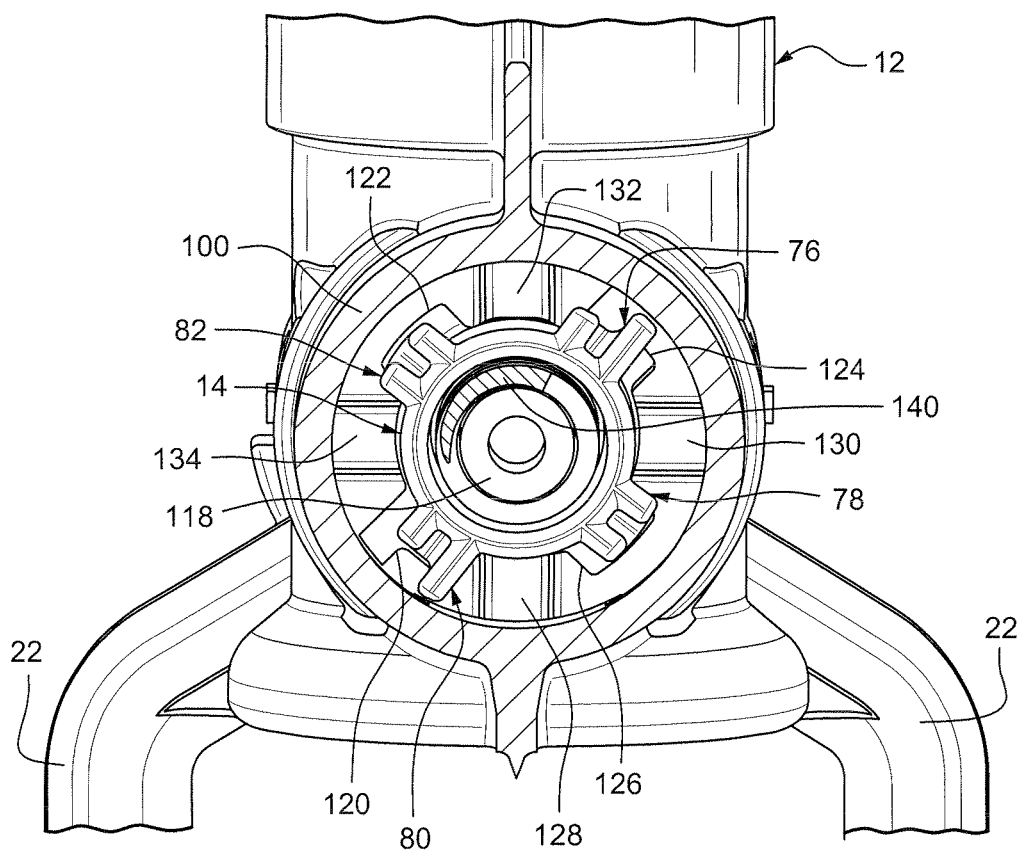
FIG. 21 is a view similar to FIG. 20 but with the insert rotated a few degrees further in the clockwise direction.

FIG. 21 is a view similar to FIG. 20 but with the insert rotated a few degrees further in the clockwise direction (counterclockwise as viewed in FIG. 21). Note that the index tabs 76, 80 with lengthened stems do not match the extended insert slots 124, 120, respectively, as the nozzle insert rotates away from the position shown in FIG. 20. Thus, the index tabs can move through the insert slots in only one position, i.e., the INSERTION position shown in FIG. 9.

Figure 22:
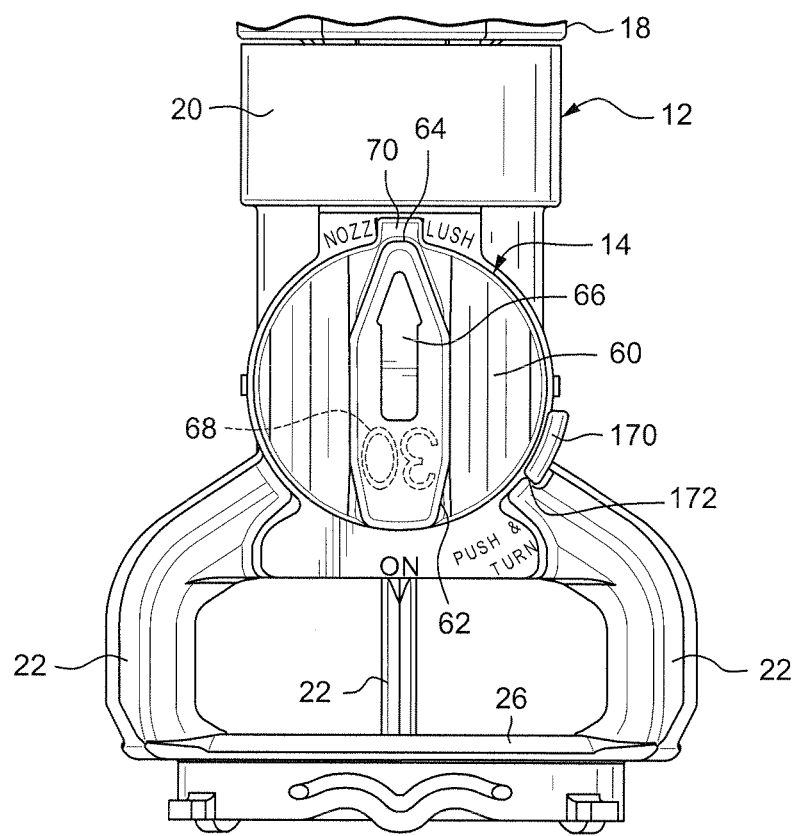
FIG. 22 is an enlarged, partial front view of the sprinkler body and nozzle insert as shown in FIG. 15 but with the nozzle insert rotated 90 degrees in a clockwise direction from the OFF position to the NOZZLE FLUSH position.
Figure 23:
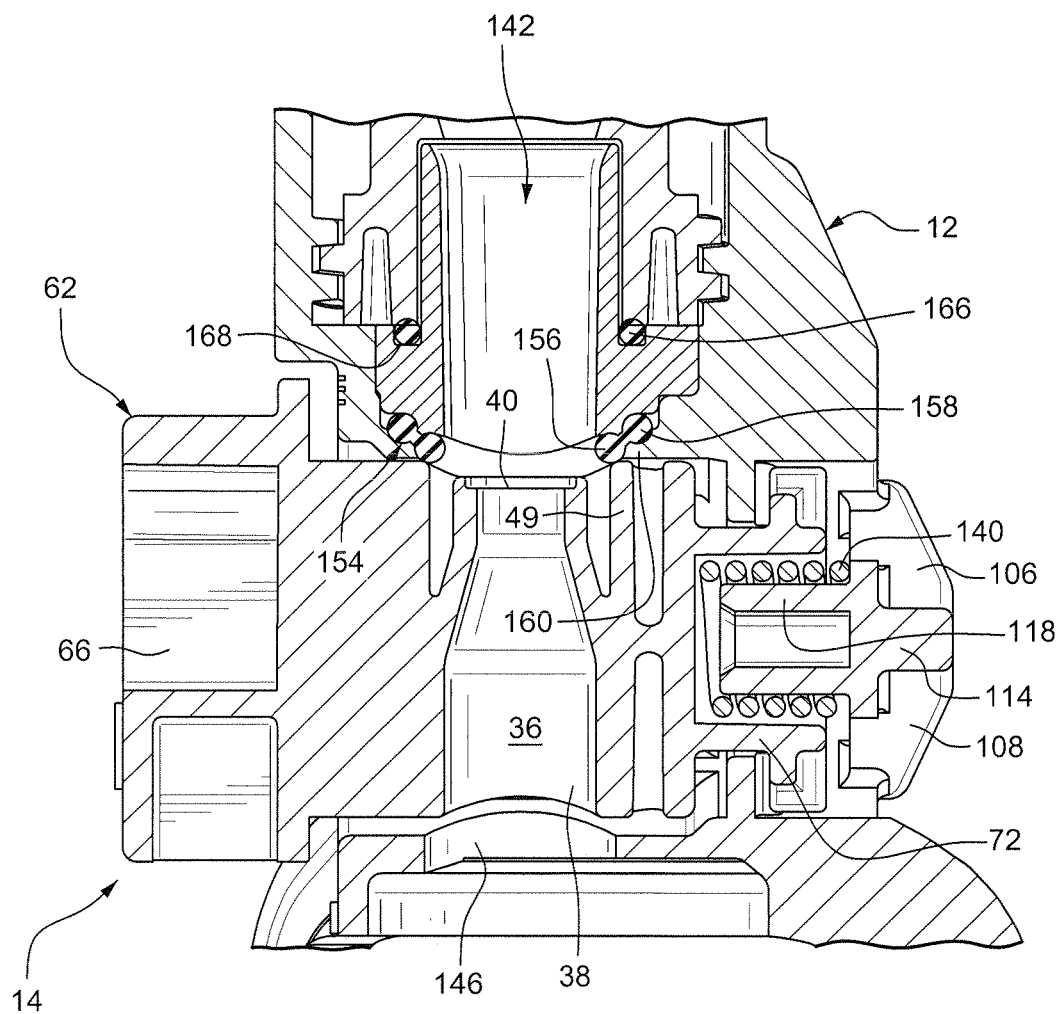
FIG. 23 is a partial vertical cross section of the sprinkler body and nozzle insert viewed from the right side as shown in FIG. 22.
Figure 23A:
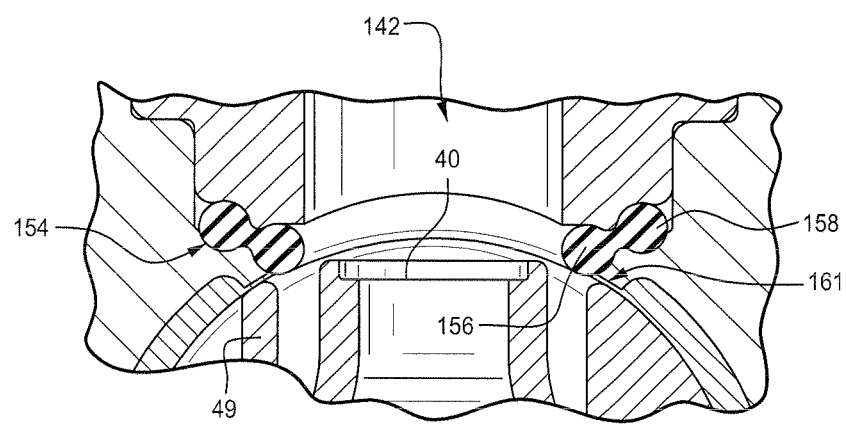
FIG. 23A is a view similar to FIG. 23 but rotated to show another circumferential portion of the sprinkler body seal relative to the nozzle insert in the NOZZLE FLUSH position.

FIGS. 22-23A show the nozzle insert rotated 90 degrees in a clockwise direction from the OFF position shown in FIG. 17 to the NOZZLE FLUSH position. Here, the nozzle bore 36 is inverted relative to its orientation in the ON position; and while not shown, it will be understood that the index tabs 76, 78, 80 and 82 are now respectively seated in index notches 132, 130, 128 and 134. With the nozzle bore 36 inverted, flushing of the bore is facilitated by the expanding diameter of the bore in the direction of flow, i.e., from the smaller-diameter orifice 40 toward the larger-diameter inlet end 38. In the NOZZLE FLUSH position, there is a significant gap 161 between the seal 154 and the nozzle bore wall 49, varying about the periphery of the seal/bore wall interface (compare FIGS. 23 and 23A). Leakage from the nozzle orifice 40 across the bore wall 49 through the gap 161 provides a visual indicator to the user, even from long distances, that the nozzle is not in the ON position. This is important because with some nozzle sizes, the user may inadvertently leave the nozzle in the NOZZLE FLUSH position thereby producing a misdirected flow and an incorrect flow rate which, if not quickly identified, can lead to crop damage.

Figure 24:
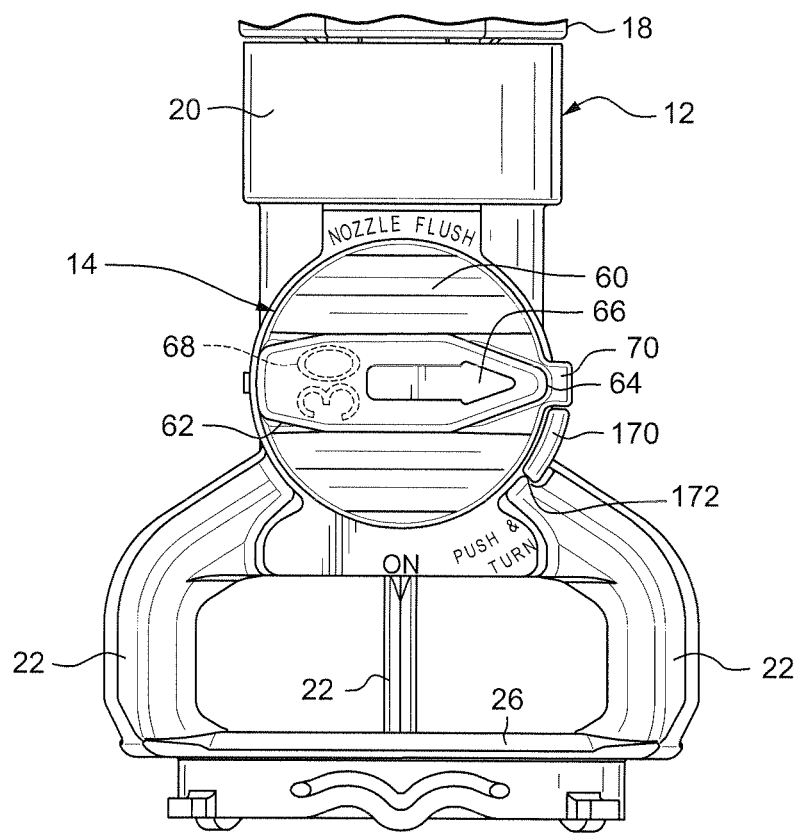
FIG. 24 is an enlarged, partial front view of the sprinkler body and nozzle insert as shown in FIG. 20 but with the nozzle insert rotated 90 degrees in a clockwise direction from the NOZZLE FLUSH position to a LINE FLUSH position.
Figure 25:
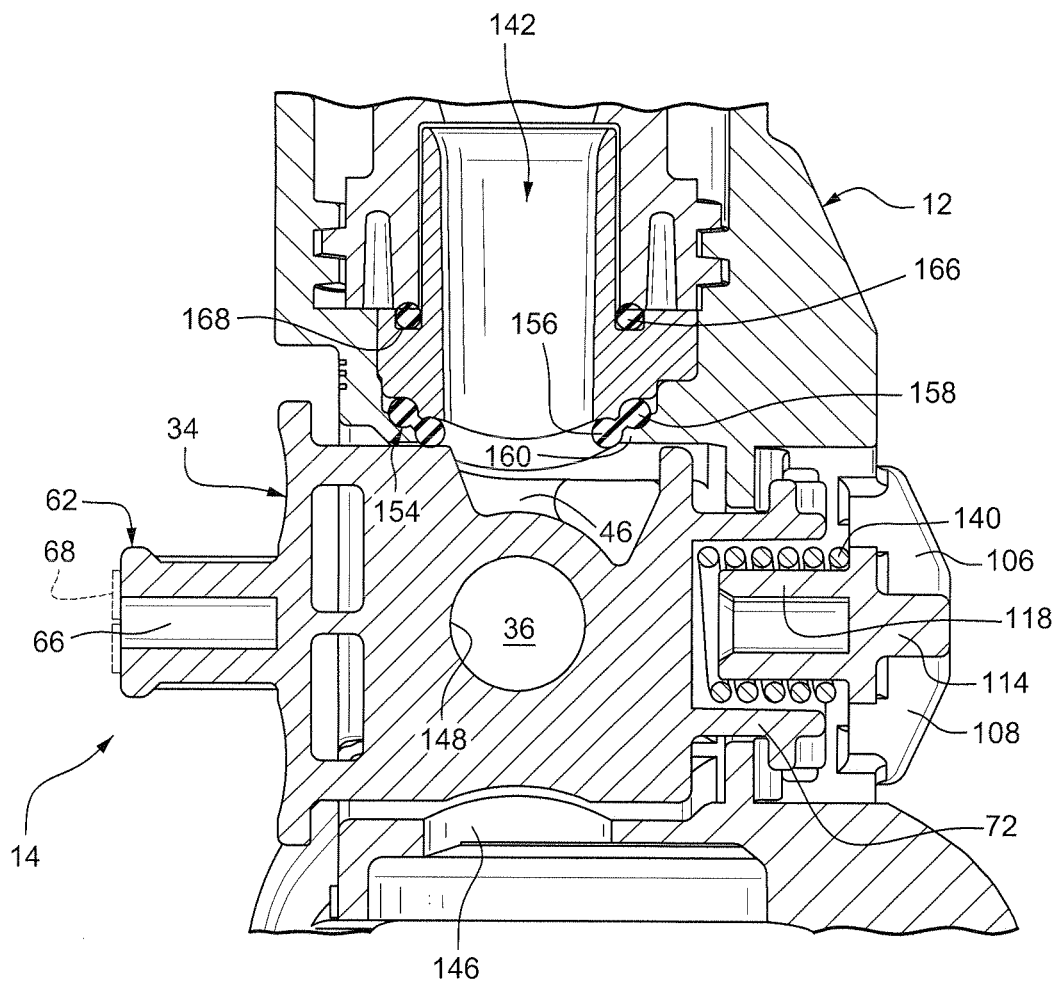
FIG. 25 is a partial vertical cross section of the sprinkler body and nozzle insert viewed from the right side as shown in FIG. 24.
Figure 26:
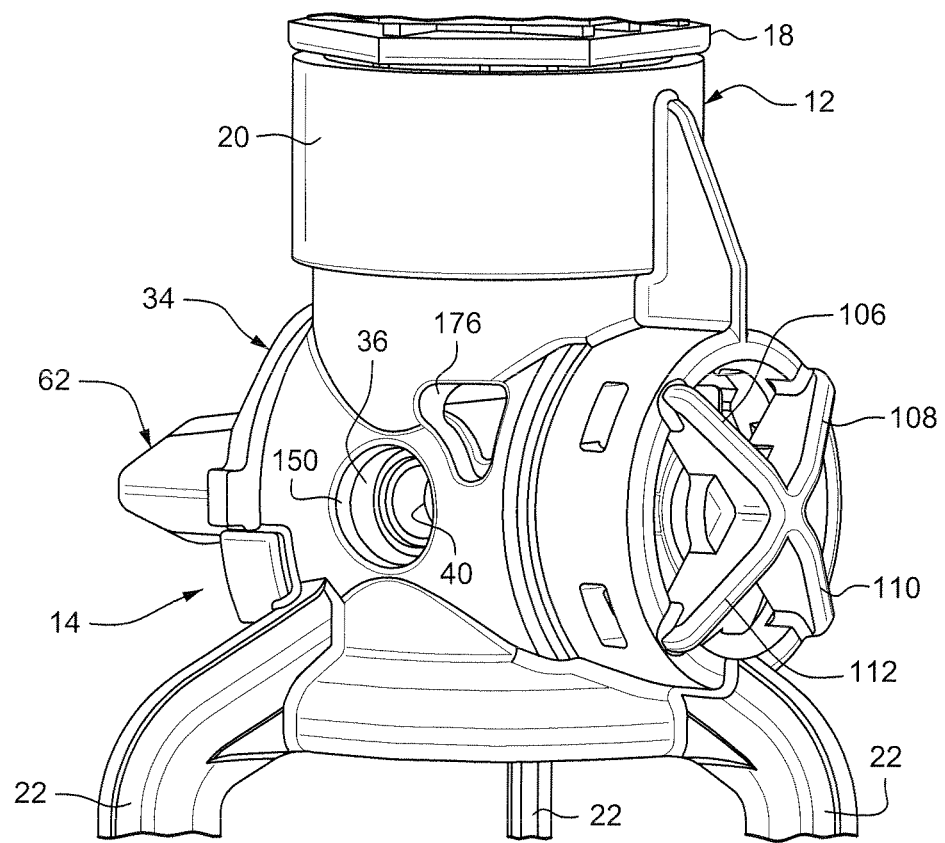
FIG. 26 is a partial right, rear perspective view of the sprinkler body and nozzle insert as shown in FIG. 25.

FIGS. 24-26 show the nozzle insert 14 rotated an additional 90 degrees in a clockwise direction from the NOZZLE FLUSH position to the LINE FLUSH position. Here, water from the sprinkler body flow passage 142 is introduced directly into the flush groove 46 and the water exits the aligned apertures 174, 176 (FIGS. 1, 7) on either side of the sprinkler body, thereby flushing the flow passage 142. Note also that in the LINE FLUSH position, the nozzle bore 36 is again aligned with the apertures or openings 148, 150 in the sprinkler body, enabling manual access and cleaning of the bore as described above.

In the LINE FLUSH position, the nozzle insert cannot be rotated further in the clockwise direction because the tab 70 is engaged with the stop tab 170. The nozzle insert 14 can, however, be rotated in a counterclockwise direction to any one of the NOZZLE FLUSH, OFF, ON or INSERTION positions. Rotation back to the INSERTION position allows easy removal (with the assistance of the spring 140) and replacement of the nozzle insert with one having, for example, a larger or smaller nozzle orifice size.

An important feature of the illustrated embodiment is the manner in which the variously-described structural features combine to accurately align the nozzle insert 14 in the ON position. More specifically, the centerline of the nozzle bore 36 must be positioned within ±0.005" of the sprinkler body flow passage centerline in the left to right and fore to aft directions, and must be positioned rotationally about axis A within ±0.5°. The combination of water pressure and seal compression forces the insert 14 (and hence the insert body 34) against ribs 136 and 138 and thereby accomplishes the left-to-right centering. The tab/detent/spring arrangement accomplishes the fore-to-aft and the rotational centering. There is also a very fine balance that has to be maintained with respect to stability and ease of use. For example, the nozzle insert needs to be securely positioned such that when jostled by crops such as corn stalks, it will not be inadvertently moved out of the desired operating position. At the same time, however, the nozzle insert must be relatively easy to insert and rotate by hand (perhaps hundreds of times in a day when doing initial assembly of pivot packages or changing out systems in the field). In addition, it is important for the user/operator to know with certainty that the nozzle is properly positioned. This is accomplished by enabling the user to feel or hear the index tabs snap or click into the index notches by reason of the axial force exerted by the spring 140. When changing operating positions, the user can push and turn (easier option) or just turn (more torque required) the nozzle insert 14 until rotation begins. Then, if the user continues turning without pushing, the nozzle insert body 34 will click into the next set of index notches. This rotation and spring action will accurately locate the nozzle insert so long as the nozzle insert is sufficiently free to move axially and rotationally and thereby enable the spring 140 to drive the index tabs fully home (i.e., where the beveled index tab surfaces are in full contact with the beveled index notch surfaces).

To insure the required freedom of movement of the nozzle insert, generous clearances are maintained between the nozzle insert and the sprinkler body wherever possible (such clearances cause the water spray mentioned above that is shielded by the forward end wall 60). Further in this regard, the nozzle insert itself is formed to permit water to leak past the seal 154 during position changes to flush out impacted sand, etc.

In another embodiment, a nozzle insert clip capable of holding a pair of nozzle inserts is provided. Generally, the clip is designed to detachably hold a nozzle insert at each of two opposite ends of the clip, such that a desired one of the two nozzle inserts can be installed within the sprinkler body as described hereinabove, with the second nozzle insert retained on the clip. It is anticipated that the nozzle orifices of the respective inserts would have different diameters, enabling the user to quickly and easily swap the nozzle inserts to adapt to irrigation requirements in localized areas.

Figure 31:
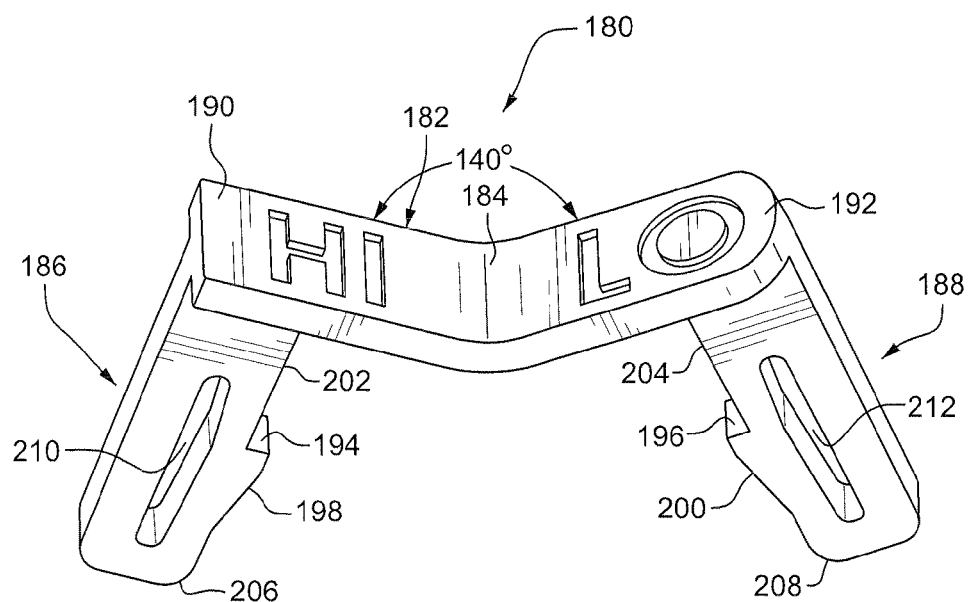
FIG. 31 is a perspective view of a dual-nozzle insert clip for use with the sprinkler/nozzle insert assemblies described herein.

With reference to FIG. 31, the clip 180 comprises a strip 182 of durable, rubberized plastic (or other suitable material), permanently bent at a mid-length location 184 to an angle of about 20 degrees, with attachment portions or arms 186, 188 extending substantially perpendicularly from opposite, distal ends 190, 192 of the strip. It will be understood that the 20-degree angle is measured relative to a horizontal reference plane, when the clip is viewed in side elevation. Stated otherwise, the portions of the strip extending from the mid-point location 184, define an included angle of about 140 degrees.

Each attachment portion or arm is substantially rectangular in shape, with offset shoulders 194, 196, respectively, approximately mid-way along the length of the respective arm. The shoulders are enabled by tapered surfaces 198 and 200, respectively, extending along opposite interior surfaces 202, 204 of the attachment arms, with the inward taper on each commencing proximate distal ends 206, 208 of the attachment arms. Elongated slots 210, 212 substantially centrally located along the lengths of the arms 186 and 188 provide flexibility to the arms, allowing them to be squeezed for purposes of attachment to, and detachment from, a pair of nozzle inserts as explained below. Indicia, such as "HI" and "LO" can be applied in any suitable manner to opposite ends of the clip to differentiate the nozzle inserts in terms of, for example, flow rate, orifice diameter, etc.

Figure 32:
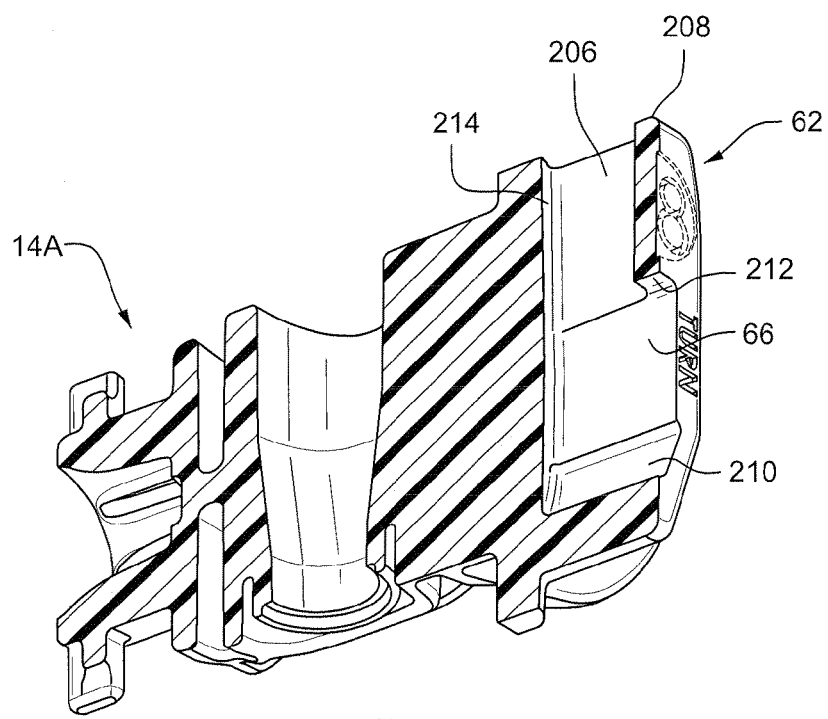
FIG. 32 is a sectioned perspective view of a nozzle insert modified to accommodate the nozzle insert clip shown in FIG. 31.

Before describing how a pair of nozzle inserts 14 can be attached to the clip 180, it is noted that the sprinkler body and the nozzle inserts remain as described above, except for a minor modification to the nozzle inserts. For convenience, in the description that follows, the same reference numerals are used to describe the sprinkler body and nozzle insert, but with new reference numerals added where appropriate. Thus, with reference to FIGS. 4 and 32, the turning knob 62 as previously described has been shown to include a recess 206 at its blunt end 208, generally aligned with the arrow-shaped indicator slot 66. For this alternative embodiment, the web or "floor" 210 of the recess 206 is removed such that the recess 206 opens into the indicator slot 66. As a result, the recess 206 in the modified nozzle insert 14A now extends from the blunt end 208 of the knob 62 to the narrowed or pointed end 210 of the indicator slot 66. For convenience, and noting that the recess 206 and slot 66 are now merged, reference will be made simply to the "extended indicator slot" 66. This modification is best appreciated in FIG. 32 and note that the upper end of the extended indicator slot 66 provides a shoulder 212 that interacts with the shoulders 194, 196 of the nozzle insert clip attachment arms 186, 188 as described further below.

Figure 33:
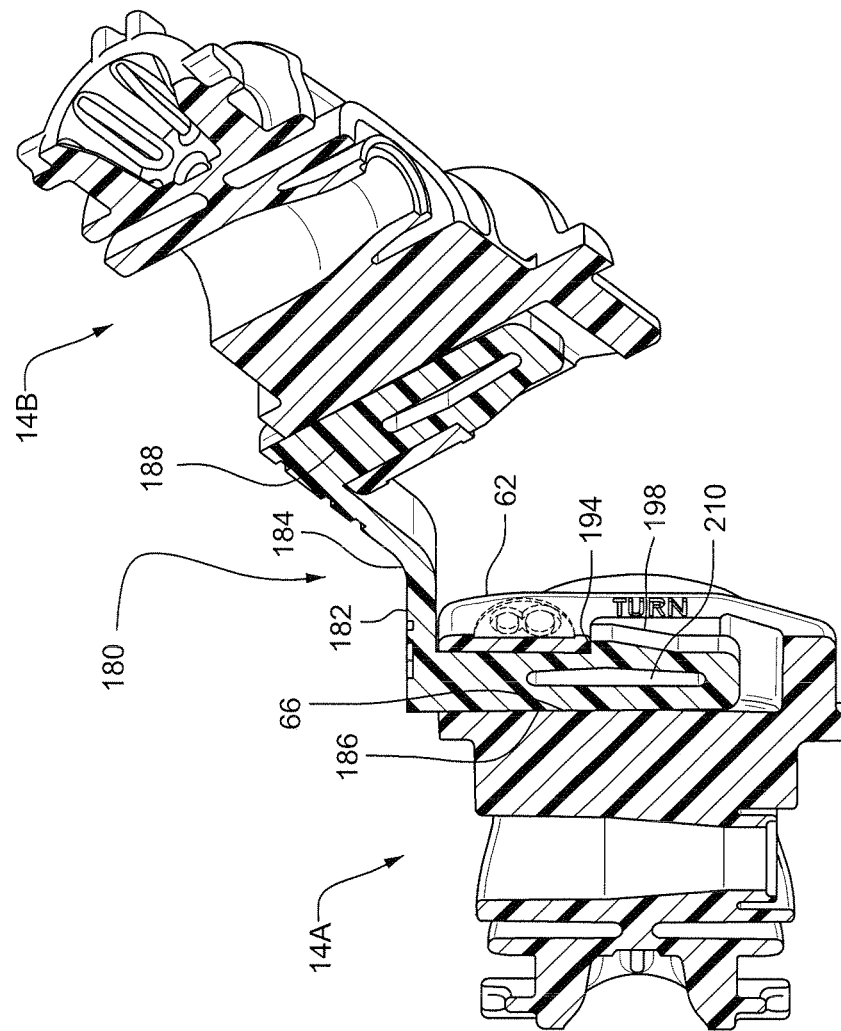
FIG. 33 is a sectioned perspective view of the nozzle insert clip shown in FIG. 31, with a pair of nozzle inserts removably attached thereto.

The attachment arms 186, 188 of the clip 180 are sized to fit snugly within the extended indicator slot 66 when inserted at the blunt end 208 of the turning knob 62. Since the attachment arms 186 and 188 are mirror images of one another, attachment/detachment of only one nozzle insert to one of the attachment arms need be described. Accordingly, with reference to FIGS. 32 and 33, the user will select, for example, a nozzle insert 14A and push the attachment arm 186 into the extended indicator slot 66 at the blunt end 208 of the knob 62. During insertion, the tapered surface 198 of the attachment arm 186 will cam the arm inwardly as a result of the flexibility provided by the slot 210, thus allowing the projecting shoulder 194 to slide along the extended slot 66 until it snaps to its normal position as it passes the shoulder 212. Note that the lower or pointed end of the extended indicator slot 66 does not interfere with the distal end 206 of the attachment arm. Note also that in order to reduce friction between the attachment arms and the nozzle inserts, a rib (FIGS. 32 and 34) may be provided along the back wall 214 of the extended indicator slot 66 to reduce the surface contact area between the attachment arm and the slot wall. Alternatively, the back wall of the slot could be formed to have a slightly convex shape to achieve the same result.

Figure 34:
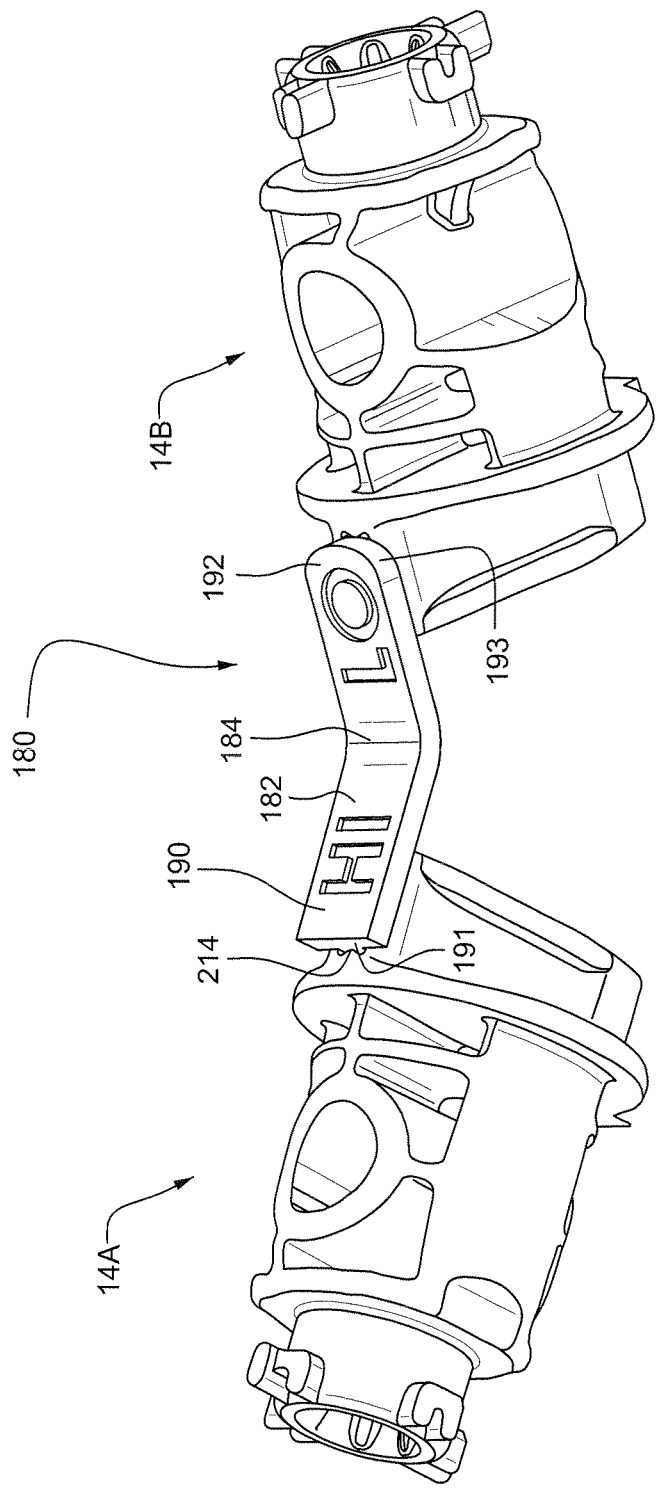
FIG. 34 is a non-sectioned perspective view of the nozzle insert clip shown in FIG. 31, with a pair of nozzle inserts removably attached thereto.

FIG. 34 illustrates the clip 180 holding a pair of nozzle inserts 14A and 14B such that the indicia HI and LO match up with the flow rates of the respective nozzle inserts. Using generic and relative indicia such as HI and Lo allows the clip to be used with any pair of nozzle inserts with different orifice sizes/flow rates. Note also that the distal edges 191, 193 of the strip 182 may have different profiles as further indicators of nozzle insert differentiation.

Figure 35:
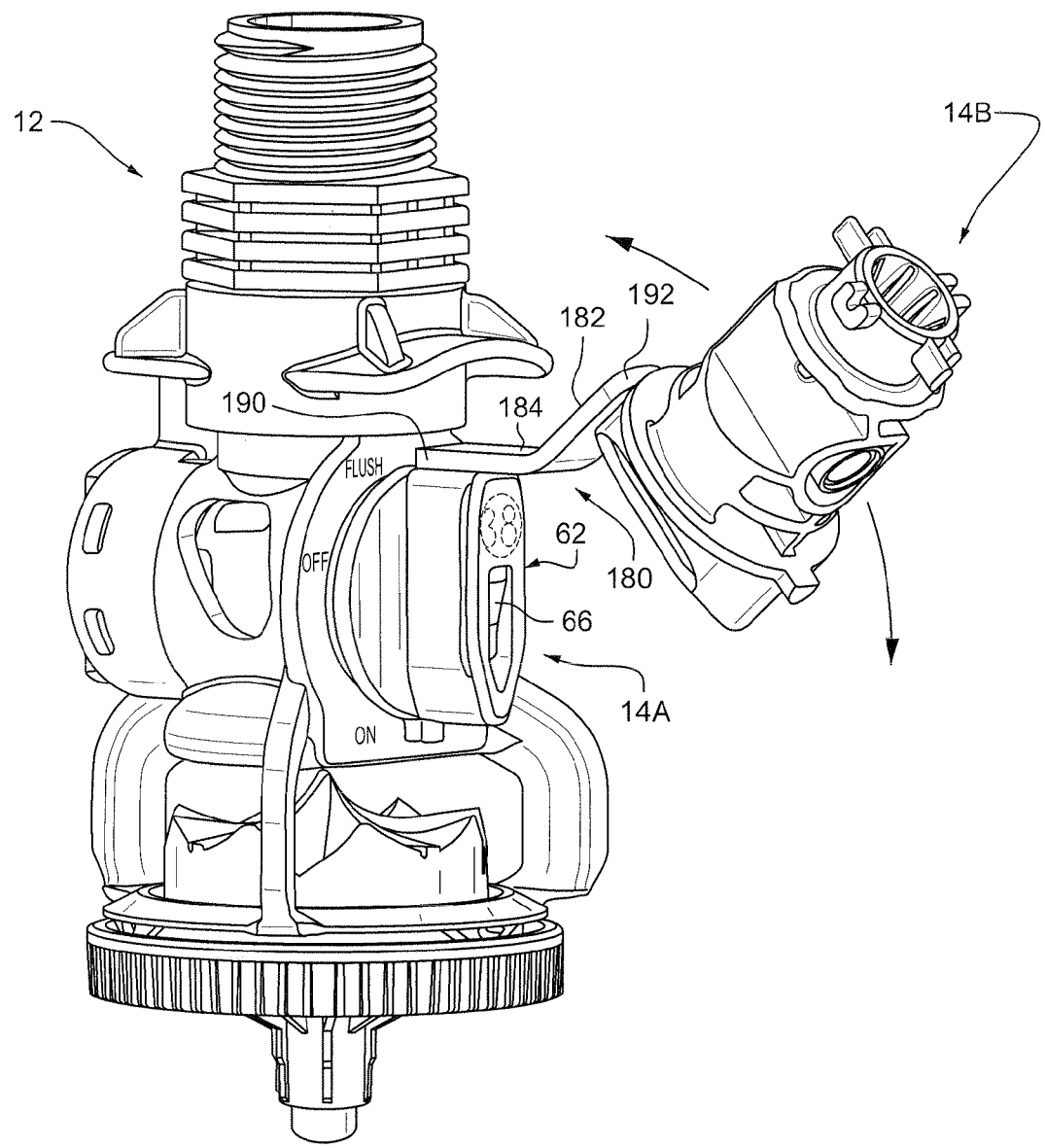
FIG. 35 is a perspective view of a sprinkler with one of the pair of nozzle inserts, attached to the nozzle insert clip as shown in FIG. 34, installed in the sprinkler body.
Figure 36:
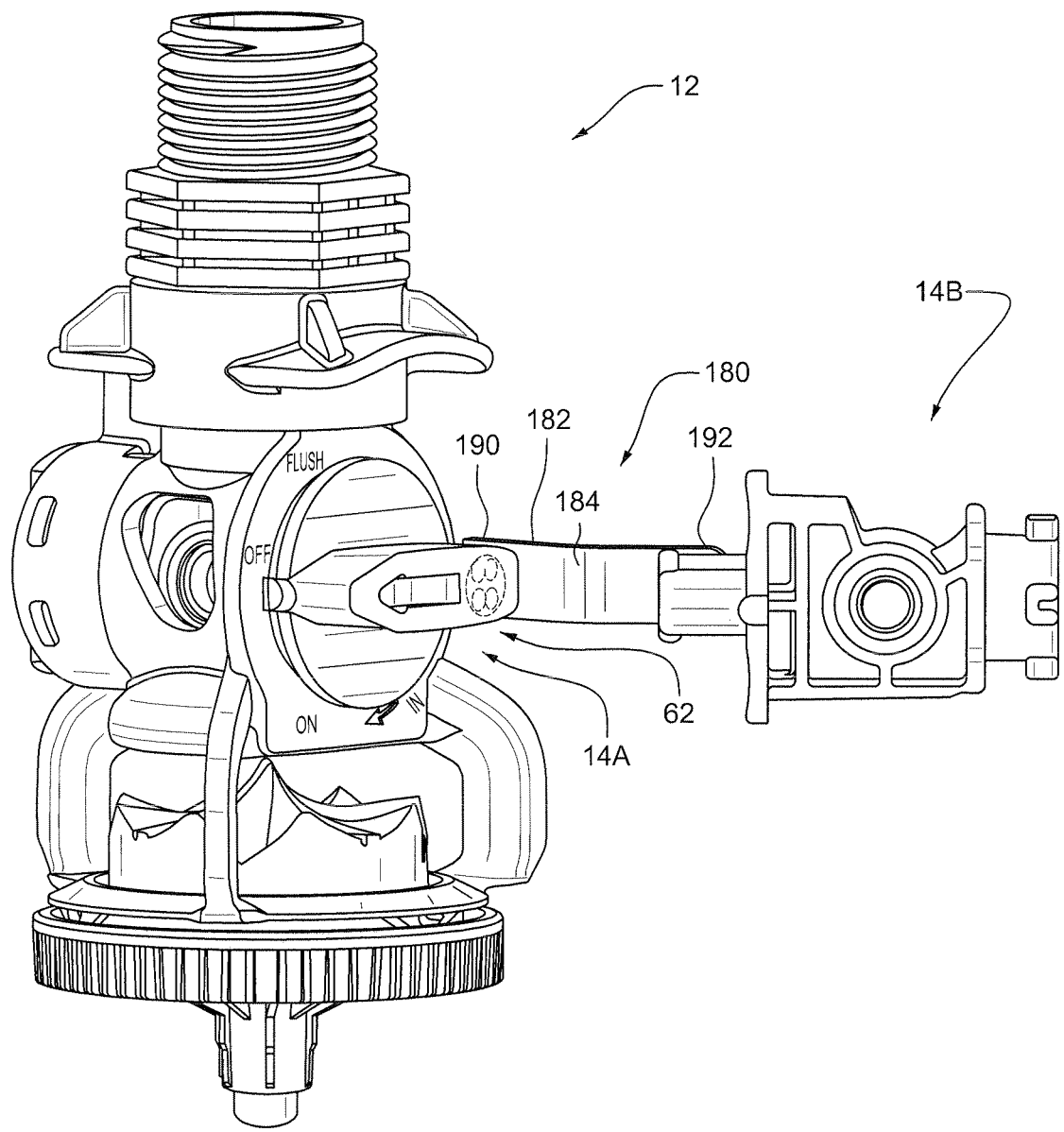
FIG. 36 is a perspective view similar to FIG. 35 but with the installed nozzle insert rotated to another operating position within the sprinkler body.

FIG. 35 illustrates how one of the nozzle inserts 14A can be secured within the sprinkler body 12 while the other of the nozzle inserts 14B remains attached to the clip 180, resiliently cantilevered away from the sprinkler body. By enabling the clip 180 to flex about the mid-point 184 of the strip 182 (see the flex arrows in FIG. 35), access to the turning knob 62 is maintained and, in addition, damage to the stored or unused nozzle insert 14B is avoided as the sprinkler is moved with an irrigation machine through the field where, depending on the height of the sprinkler above ground and the height of the irrigated crops, repeated or even continuous engagement with the crops may occur. FIG. 36 simply shows how the clip 180 and the stored or unused nozzle insert 14B rotate with the turning knob 62 as it moves between its operating positions as described above.

To swap the nozzle insert 14B for the nozzle insert 14A, the user merely need remove the nozzle insert 14A from the sprinkler body as described above, reverse the clip and reorient the nozzle insert 14B for insertion into the sprinkler body.

Figure 37:
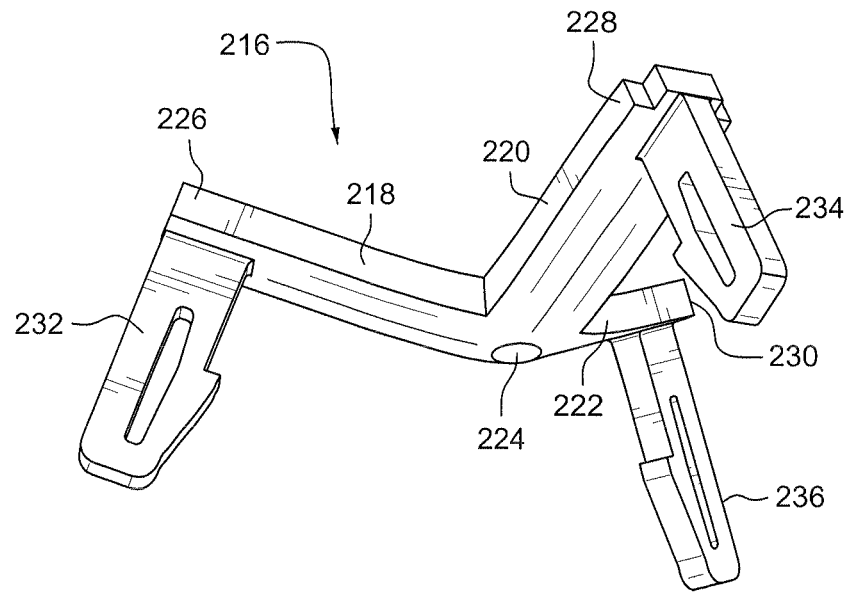
FIG. 37 is a perspective view of a nozzle insert clip in accordance with another exemplary but nonlimiting embodiment.
Figure 38:
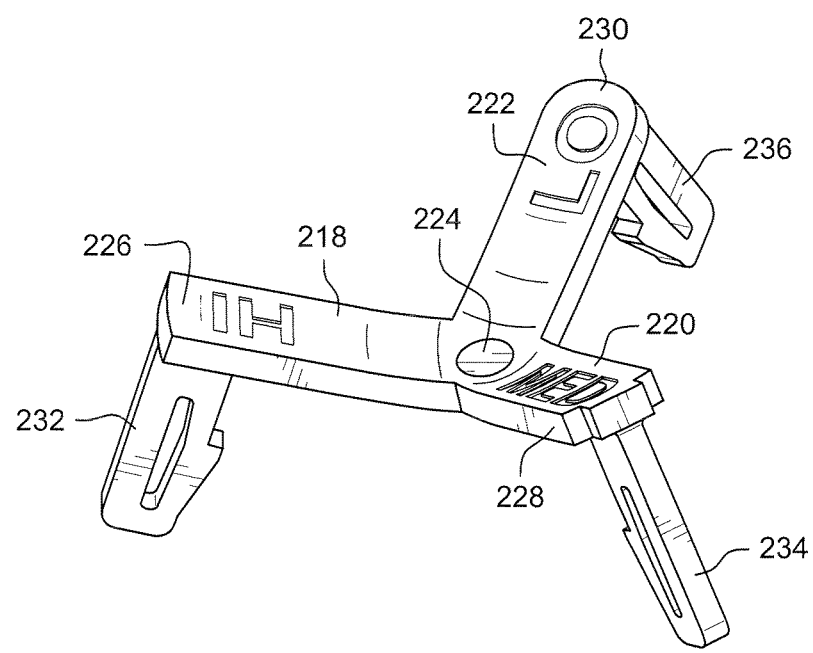
FIG. 38 is another perspective view of the nozzle insert clip shown in FIG. 37.
Figure 39:
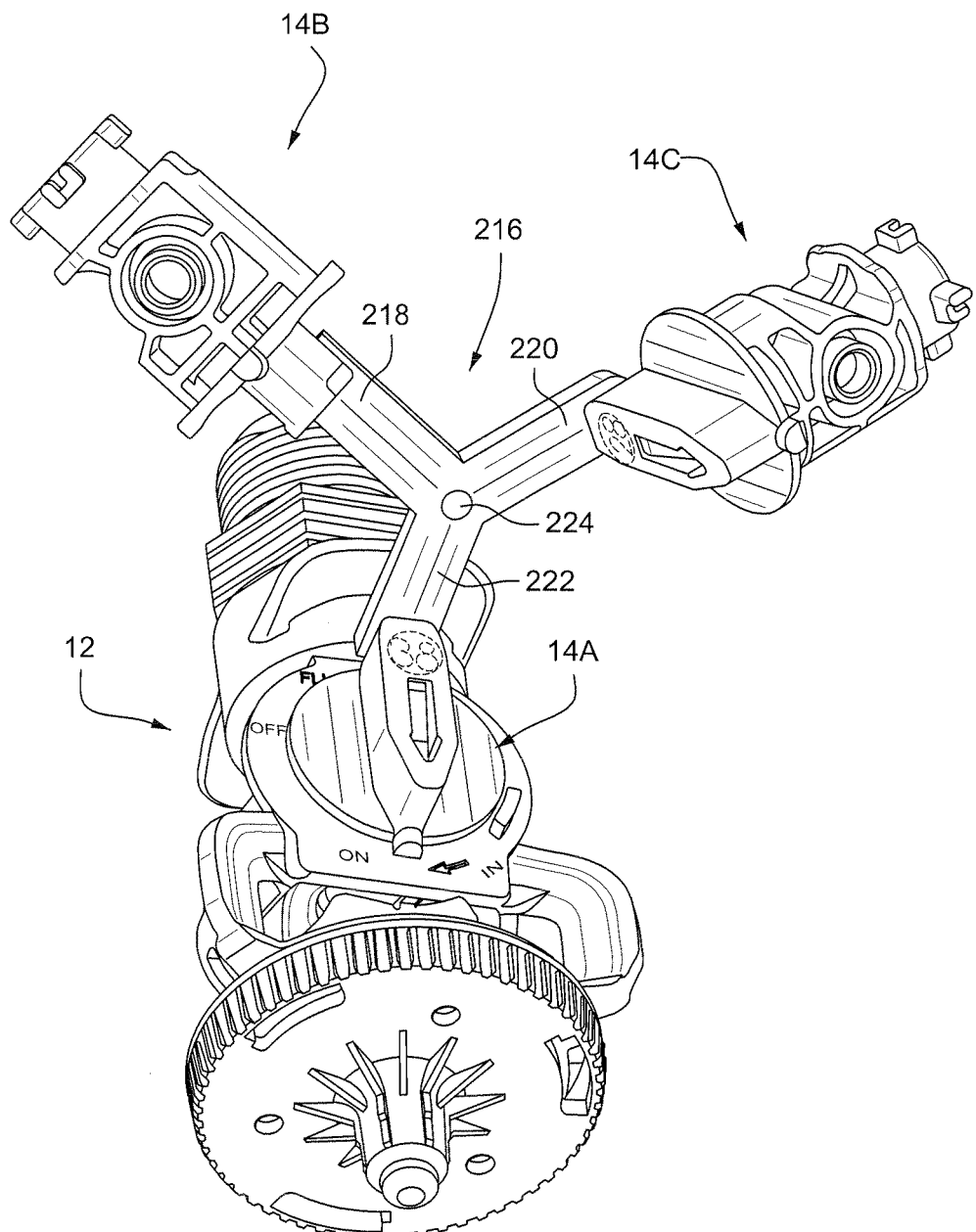
FIG. 39 is a perspective view of the nozzle insert clip of FIGS. 38 and 39 with one of the nozzle inserts installed in the sprinkler body.

FIGS. 37 and 38 illustrate a second embodiment of a nozzle insert clip which is capable of holding two additional nozzle inserts. Specifically, the clip 216 is provided with three strips 218, 220 and 222 extending from a center location or hub 224. The strips are spaced substantially equally at about 60-degree intervals about the center hub, and are similarly bent upwardly at about 20-degree angles, relative to horizontal. The distal ends 226, 228 and 230 of the strips are provided with attachment arms 232, 234 and 236, respectively, that are otherwise identical to the attachment arms of the clip 180, extending substantially perpendicularly from their respective strips. As in the previously described embodiment, the clip 216 may be composed of rubberized plastic or other suitable material that provides the requisite flexibility to the arms. As best seen in FIG. 38, the indicia applied to the distal ends of the attachment arm may indicate HI, LO and MED flow rates, and here again, the distal edges of the strips may have differently-profiled edges to provide additional differentiation. The manner of attachment of the nozzle inserts to the clip remains as explained above in connection with FIGS. 31-36 and need not be repeated. FIG. 39 shows the triple-capacity clip 216 with one of the nozzle inserts 14A installed within the sprinkler body 12, and with two additional nozzle inserts 14B and 14C attached to the clip and available for use with the sprinkler body when it is desired to change the flow rate of the sprinkler nozzle.

Figure 40:
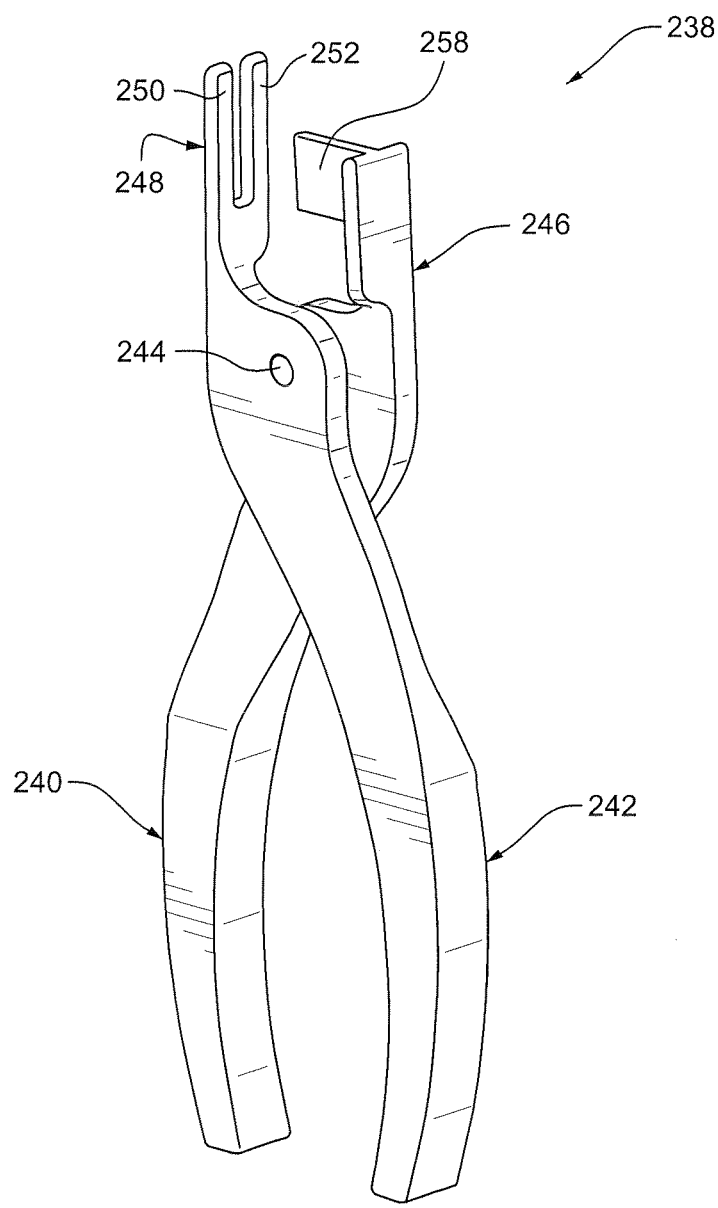
FIG. 40 is a side elevation of a tool adapted for facilitating removal of a nozzle insert from the nozzle clips of FIGS. 31 and 37.
Figure 41:
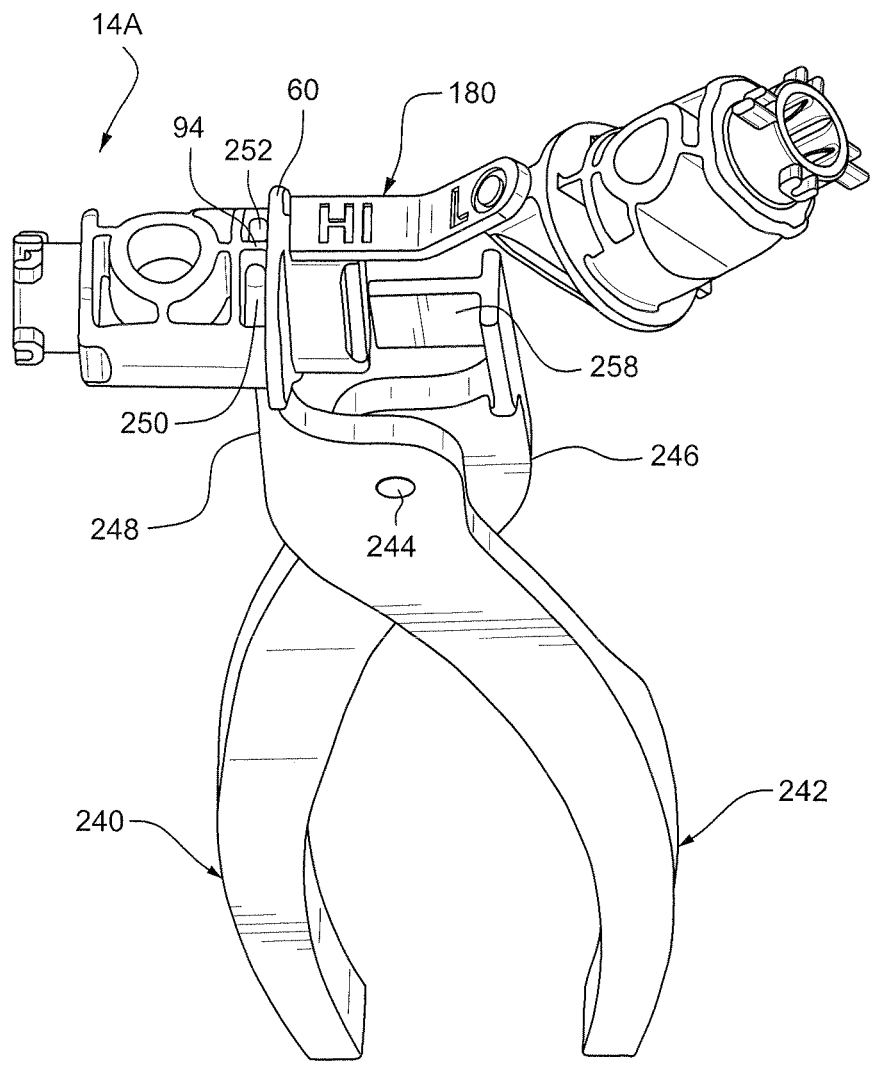
FIG. 41 is a perspective view of the tool of FIG. 40 in position to facilitate removal of the nozzle insert from the associated clip.
Figure 42:
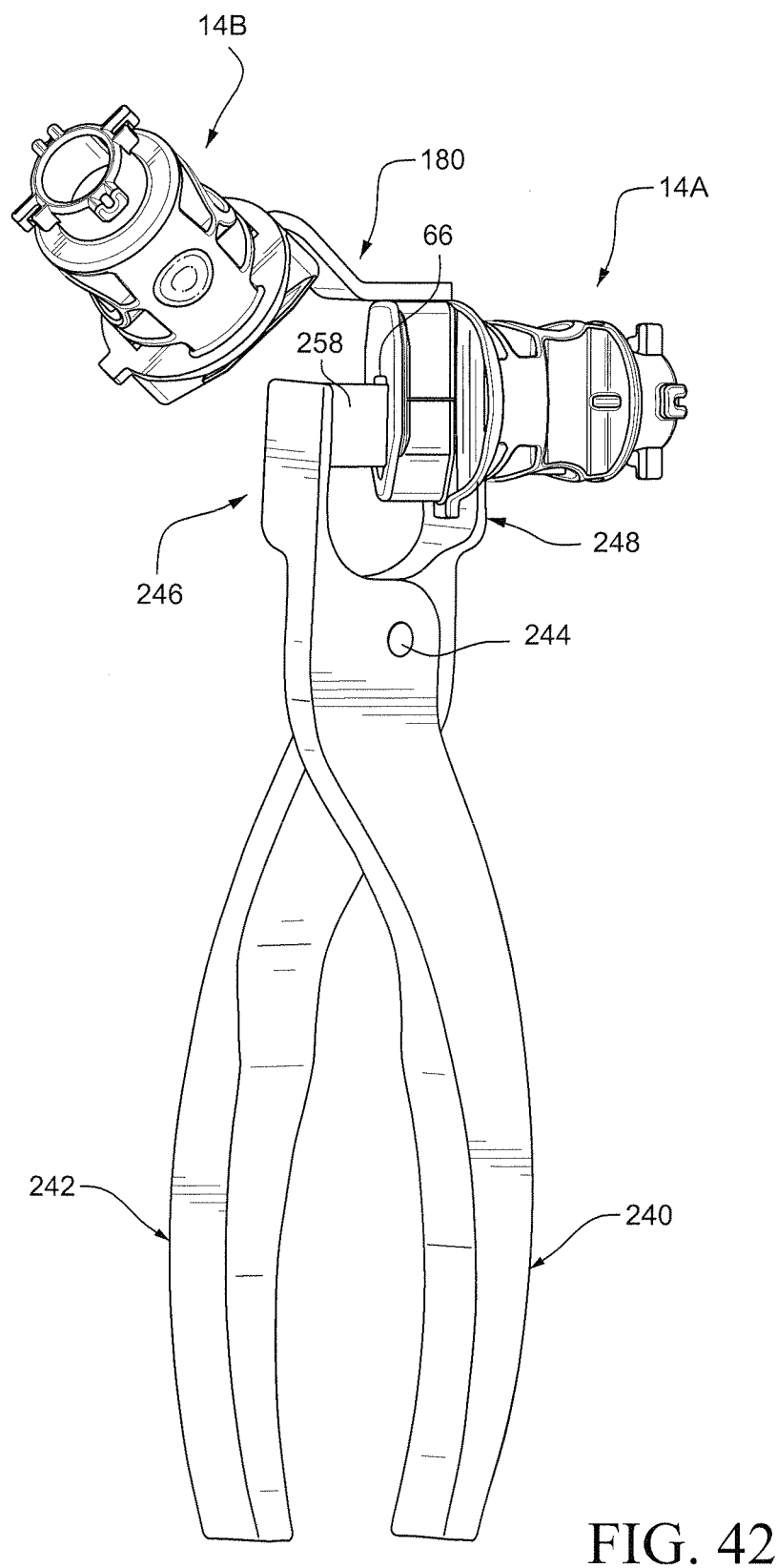
FIG. 42 is a view similar to FIG. 41 but taken from a different perspective.

It will be appreciated that at various times, it may be desirable to remove one or both nozzle inserts from the clip, for example, when it is desired to replace a nozzle insert of one flow rate with a nozzle insert of another flow rate or to replace a damaged insert. A pliers-like tool for facilitating removal is shown in FIGS. 40-42. Specifically, the tool 238 includes a pair of gripper arms 240, 242 that are pivotally attached via pin 244 and that cross over to provide opposed jaws 246 and 248, respectively, on opposite sides of the pin 244. The jaw 248 is formed with a pair of parallel prongs 250, 252 which are designed to fit within the adjacent through-slots 254, 256 (FIGS. 4-5) on either side of the rib 94 behind the end wall 60 of the turning knob 62, as best seen in FIG. 41. The other jaw is formed with a flat head 258 extending perpendicularly from the jaw 246 toward the space between the prongs 250, 252. The flat head 258 is designed to fit within the side (or front) opening of the extended indicator slot 66 as best seen in FIG. 42. With the pliers oriented as shown in FIGS. 41-42, the user will squeeze the gripper arms 240, 242, with one hand such that the flat head 258 will engage the attachment arm 186 of the clip 180 inside the slot 66 and push (flex) it inwardly until the attachment arm shoulder 194 moves inwardly beyond the edge of the slot edge or shoulder 212, thereby allowing the user to pull the clip 180 out of the extended slot 66 of the nozzle insert 14A from its open upper end with his/her other hand. The tool 238 may be used with the triple-capacity clip 216 in the same manner.

Alternatively, the user can press a flat screwdriver blade into the extended indicator slot 66 from the side (or front) of the slot, pushing the shoulder 194 inwardly beyond the edge of shoulder 212, again allowing the clip to be pulled out of the extended slot.

While the invention has been described in connection with what is presently considered to be the most practical and preferred embodiment, it is to be understood that the invention is not to be limited to the disclosed embodiment, but on the contrary, is intended to cover various modifications and equivalent arrangements.

What is claimed:

1. A nozzle insert in combination with a nozzle insert clip for loading into a complementary recess in a sprinkler body comprising: an insert body having an axis of rotation, a nozzle bore extending through said insert body; and a directional turning knob at a forward end of said insert body enabling rotation of said nozzle insert relative to said sprinkler body when the insert body is installed within said sprinkler body, said directional turning knob incorporating openings along a front wall of said turning knob and at one end wall of said turning knob, said turning knob receiving through one of said openings an attachment arm of the nozzle insert clip capable of holding at least two of said nozzle inserts, wherein said one of said openings includes an inside shoulder, the nozzle insert clip comprising at least two flexible attachment arms, each attachment arm provided with an elongated slot and a retention shoulder on an inside surface thereof, adjacent said elongated slot, said elongated slot defining a deflection zone for said retention shoulder, said retention shoulder engaging said inside shoulder by deflection of the flexible attachment arm into the deflection zone when the flexible attachment arm is received in the turning knob.

2. The nozzle insert of claim 1 wherein said directional turning knob is provided on a forward side of an end wall and wherein a pair of substantially parallel through openings are located on a rearward side of said end wall.

3. The nozzle insert of claim 2 wherein a rib that partially defines said through-openings is in substantial alignment with said elongated slot.

4. The nozzle insert of claim 1 in combination with a nozzle insert clip, wherein said at least two, flexible attachment arms hold said nozzle insert and at least one additional nozzle insert, and wherein said nozzle insert is located within the complementary recess in the sprinkler body while said nozzle insert and said at least one additional nozzle insert are held on said clip.

5. The nozzle insert of claim 4 wherein said nozzle insert clip is provided with three flexible attachment arms for holding said nozzle insert, said additional nozzle insert and a third nozzle insert.

6. A clip and nozzle insert assembly for use with an irrigation sprinkler, the clip comprising at least two flexible attachment arms; each attachment arm provided with an elongated slot and a retention shoulder on an inside surface thereof, adjacent said elongated slot, each attachment arm received in an opening in a respective nozzle insert, wherein said opening includes an inside shoulder therein, said elongated slot defining a deflection zone for said retention shoulder, said retention shoulder engaging said inside shoulder by deflection of the flexible attachment arm into the deflection zone when the flexible attachment arms are received in the nozzle inserts, the clip and nozzle insert assembly further comprising a tool for facilitating removal of the nozzle insert from the clip, the tool including a pair of gripper arms and a respective pair of jaws extending from said gripper arms, pivotally secured to one another about a pivot, and first and second jaws at opposite ends of said pair of gripper arms, respectively; one jaw comprising a pair of parallel prongs, and the other of said jaws comprising a flat head projecting toward said pair of prongs.

7. The clip and nozzle insert assembly of claim 6 wherein said clip comprises three flexible attachment arms.

8. The clip and nozzle insert assembly of claim 6 wherein said flat head extends substantially perpendicularly to said other of said jaws.

* * * * *